United States Patent [19]
Curtil

[11] Patent Number: 5,819,693
[45] Date of Patent: Oct. 13, 1998

[54] METHOD FOR IMPROVING THE OPERATION OF AN AIR-SCAVENGED SUPERCHARGED HEAT ENGINE, AND HEAT ENGINE THEREFOR

[76] Inventor: Remi Curtil, 8, rue Nicolas-Chuquet, F-75017 Paris, France

[21] Appl. No.: 640,736

[22] PCT Filed: Nov. 18, 1994

[86] PCT No.: PCT/FR94/01348

§ 371 Date: May 6, 1996

§ 102(e) Date: May 6, 1996

[87] PCT Pub. No.: WO95/14853

PCT Pub. Date: Jun. 1, 1995

[30] Foreign Application Priority Data

Nov. 22, 1993 [FR] France .................................. 93 13922

[51] Int. Cl.⁶ .................................................. F02B 25/00
[52] U.S. Cl. .............................. 123/65 E; 123/65 VD; 123/65 BA
[58] Field of Search .................. 123/76, 65 VD, 123/65 B, 65 BA, 65 E

[56] References Cited

U.S. PATENT DOCUMENTS

| | | | |
|---|---|---|---|
| 4,809,649 | 3/1989 | Brinkman | 123/76 |
| 4,986,224 | 1/1991 | Zuffi | 123/77 |
| 5,063,886 | 11/1991 | Kanamaru et al. | 123/65 VD |

FOREIGN PATENT DOCUMENTS

| | | |
|---|---|---|
| 201404 | 11/1986 | European Pat. Off. . |
| 1030063 | 6/1953 | France . |
| 1153612 | 3/1958 | France . |
| 2271393 | 12/1975 | France . |
| 2448032 | 8/1980 | France . |
| 1526312 | 7/1963 | Germany . |
| 3940992 | 6/1991 | Germany . |
| 435860 | 10/1967 | Switzerland . |

*Primary Examiner*—Marguerite McMahon
*Attorney, Agent, or Firm*—Pillsbury Madison & Sutro LLP; Cushman Darby Cushman Intellectual Property Group

[57] ABSTRACT

A method wherein a number of cylinders (2, 3; 1, 4) are grouped on a same exhaust gas manifold (8, 10) such that the pressure in the exhaust pipe (1e . . . 4e) undergoes time-dependent fluctuations of substantial amplitudes, and the exhaust valve (6) of a cylinder (1) is opened during induction or filling thereof (i.e. adjacent to the bottom dead center) so that, in a given engine speed range, a phase (28) of low instantaneous exhaust pressure prevailing in the exhaust pipe enables the inlet pipe (1a)/cylinder (1)/exhaust pipe (1e) to be scavenged while the inlet valve (5) and the exhaust valve (6) are simultaneously open. The phase (29) of high instantaneous exhaust pressure, caused by another cylinder, after the inlet valve (5) has closed and while the exhaust valve (6) is still open, is used for post-charging the cylinder (1) with air (A) previously stored in the exhaust pipe (1e). The size of the turbine (T) is selected so that there is virtually no post-charging of the cylinder (1) with exhaust gases at engine speeds above said given engine speed range.

26 Claims, 10 Drawing Sheets

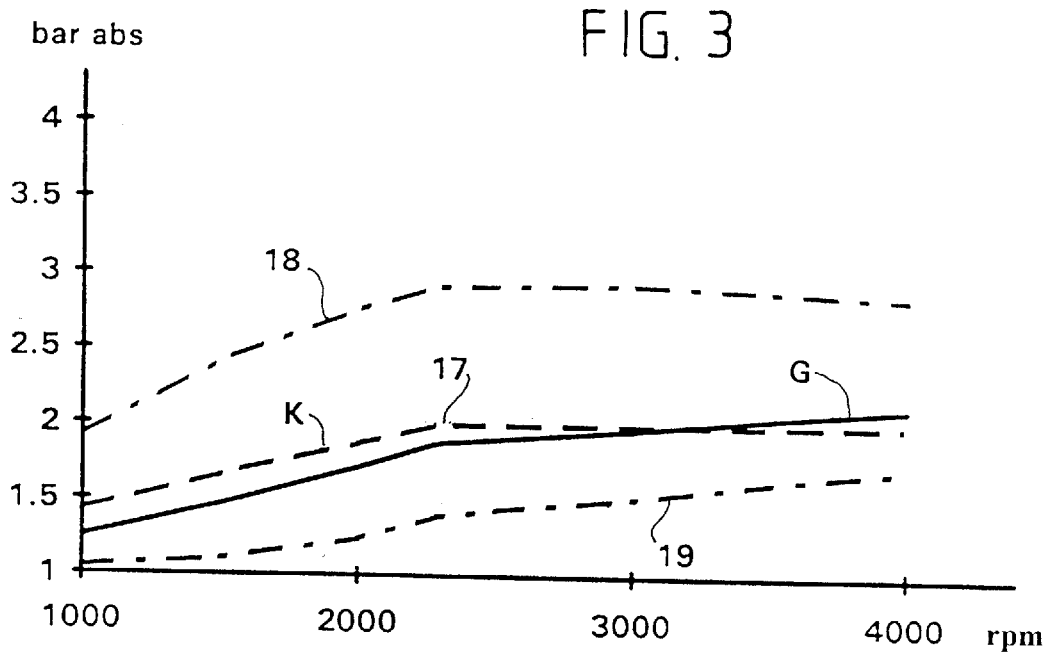
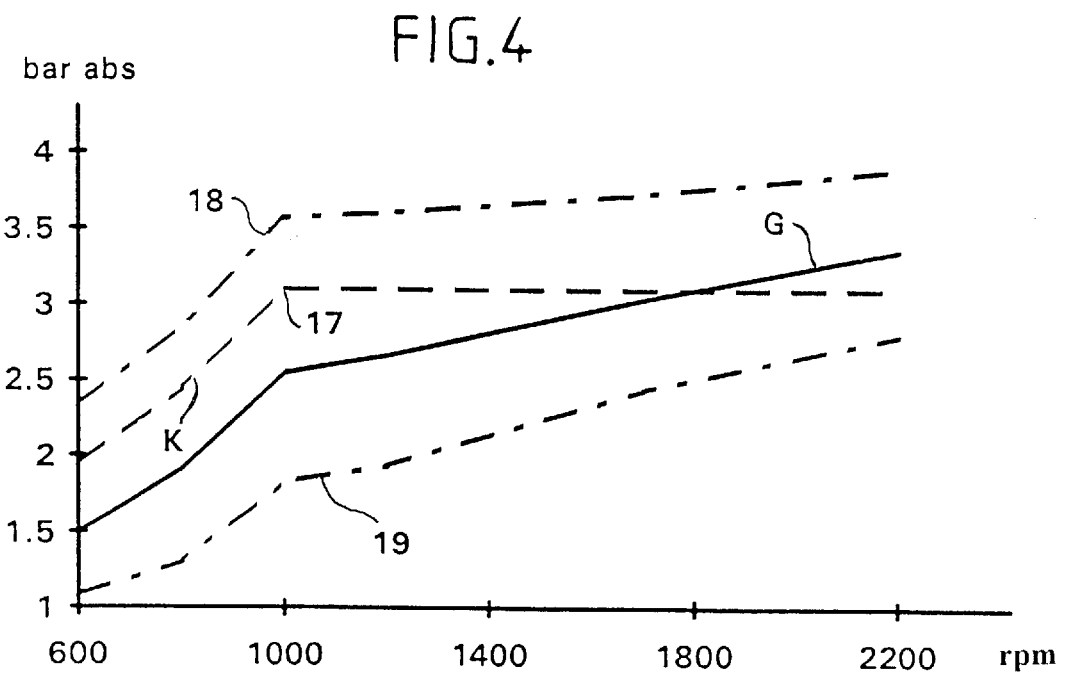

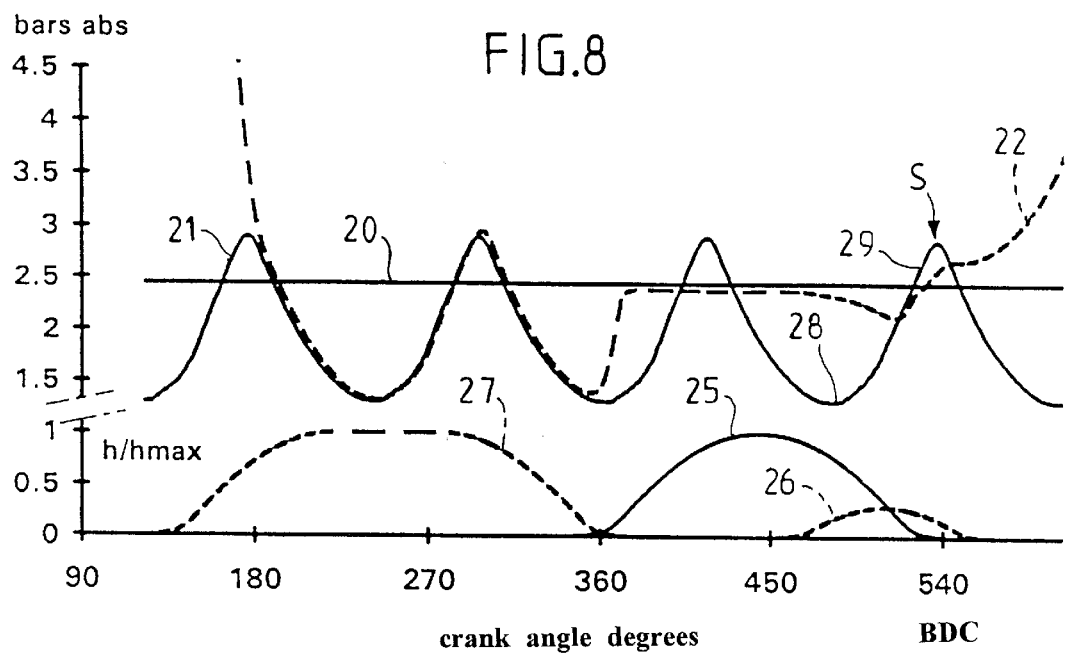
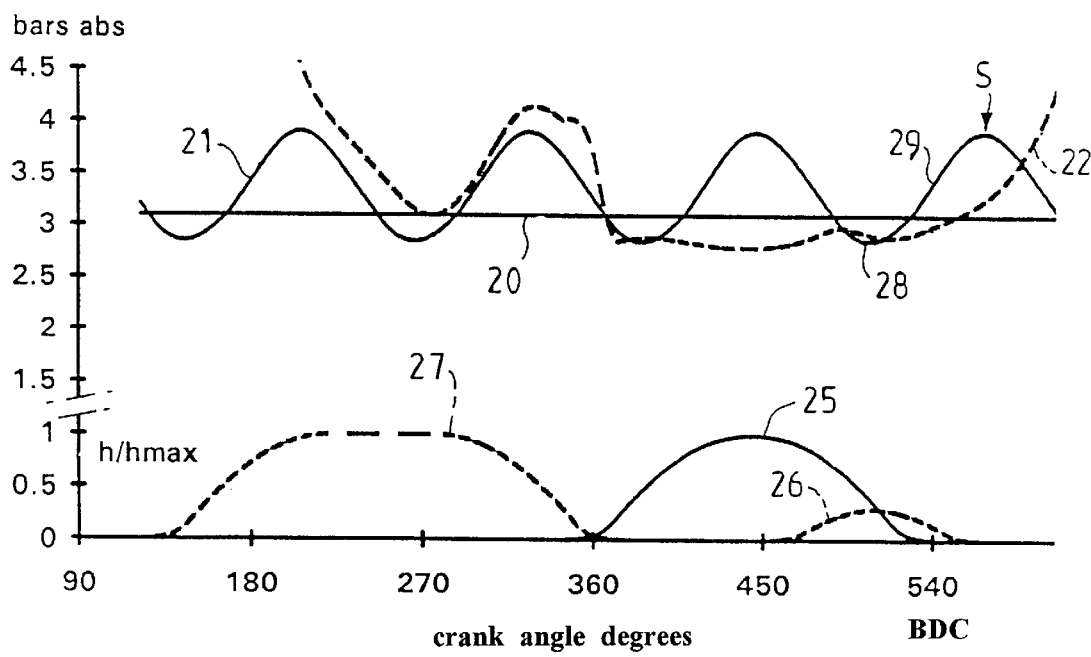

METHOD FOR IMPROVING THE OPERATION OF AN AIR-SCAVENGED SUPERCHARGED HEAT ENGINE, AND HEAT ENGINE THEREFOR

This application claims benefit of international application PCT/FR94/01348, filed Nov. 18, 1994.

FIELD OF THE INVENTION

The invention applies to a process to improve the operating of an internal combustion engine (heat engine) which is supercharged, mainly with a turbocharger, and scavenged with air.

More specifically, the invention relates to diesel engines in which the cylinders are scavenged with air; however, the invention also applies to petrol engines (or even gas) with direct fuel (or gas) injection into the cylinder.

BACKGROUND OF THE INVENTION

FR-A-2 448 032 relates to supercharged four-stroke diesel engines with approximately constant pressure in the exhaust manifold. In this document the utilisation of the natural evolution of the relationship between the supercharging air pressure and the back-pressure in the exhaust of the cylinder relies on the instantaneous manifold pressure curves being as constant as possible, particularly in the exhaust manifold, that is, curves whose pressure fluctuations remain small in comparison to the average pressure. In this case care is taken to ensure that the maximum instantaneous pressure in the exhaust manifold does not exceed the boost pressure so that during the valve overlap period, the scavenging of the cylinder is not disturbed, except at very low loads when a slight backflow scavenging may be admissible. This type of exhaust manifold with constant pressure, which is well known in high-output industrial engines (where many cylinders are connected to a single manifold supplying the turbine inlet of the turbocharger) has two embodiments:

- by using a manifold with a very wide diameter, of a similar magnitude to the cylinder bore or greater,
- by placing a pulse converter at the outlet of each cylinder, thus restricting the flow of the pulse by converting its pressure energy into velocity and thus permitting the use of a manifold with a smaller cross-sectional area in which the instantaneous pressure fluctuations are weak enough not to impair the scavenging of the different cylinders connected to a same manifold.

However, an embodiment has been envisaged (see Page 11, lines 28–32) for the characteristics set out in FR-A-2 448 032 in the case of an engine with an "impulse" or "pulse converter" system in which pressure variations or "pulses" occur in the exhaust manifold. This embodiment has been proposed for cases in which the time intervals between the pulses are sufficiently long. In other words, in the embodiment envisaged for an engine with pulses in its exhaust manifold, it is necessary to utilise the intervals between the pulses in order to avoid the perturbations created by the pressure variations corresponding to the pulses.

Conversely, the present invention, which follows a totally different approach from that of FR-A-2 448 032, aims to exploit the presence of pulses, i.e. of appreciable pressure variations in the exhaust manifold. It also aims to utilise these pulses to induce self-supercharging using a post-charging effect, which is advantageous especially at low engine speeds, without, however, producing an undesired effect at higher engine speeds, particularly that of post-charging with exhaust gas.

It is known that turbocharging, which is efficient at all engine speeds, is all the more difficult in an engine with a wide speed range and low power output, for example a car engine. In fact, the turbochargers in such engines have a low efficiency because they are small in size.

For such engines (cars or similar sized engines) in order to lessen the drawback of a lack of supercharging air at low engine speeds, two techniques have been developed:

- the first consists in using a bypass valve (normally called a "wastegate") at the turbine inlet that opens above a certain boost pressure threshold so that this pressure does not exceed a given threshold; this technique permits the use of turbines with a very small flow area, resulting in a higher boost pressure at low engine speeds at the cost of increased exhaust back-pressure at high engine speeds;
- the second technique consists in using a variable geometry turbine which as well allows a higher boost pressure at low engine speeds without increasing the exhaust back-pressure to such a large extent as in the first one.

SUMMARY OF THE INVENTION

One of the main aims of the invention is to improve the operating of the engine, particularly at low engine speeds, whatever the size of the engine may be, whether or not it has a "wastegate" bypass and/or a variable geometry turbine.

The invention consists in exploiting the exhaust pressure fluctuations or exhaust pulses, in the exhaust pipe, and in using the low instantaneous exhaust pressure phases which allow scavenging to occur from the intake port, through the cylinder, to the exhaust port and in using the high instantaneous exhaust pressure phases for post-charging the cylinder with the air previously stored in the exhaust pipe, within a given engine speed range, the turbocharger having been chosen to avoid "backflow scavenging" and harmful "post-charging" with exhaust gases, at higher engine speeds than the above-mentioned given speed range.

The preferred given speed range is that of the low engine speeds, whilst the turbocharger does not supply sufficient pressure to ensure effective supercharging.

Thus, according to the invention, the process for improving the operation of an internal combustion engine, supercharged mainly by a turbocharger and scavenged with air is characterised by the fact that a number of cylinders are grouped on a same exhaust gas manifold such that the pressure in the exhaust pipe undergoes time-dependent fluctuations of substantial amplitudes and that the exhaust valve of a cylinder is opened during induction or filling thereof so that, in a given engine speed range, a phase of low instantaneous exhaust pressure prevailing in the exhaust pipe enables the inlet pipe/cylinder/exhaust pipe to be scavenged while the inlet valve or inlet port and the exhaust valve are simultaneously open and that the phase of high instantaneous exhaust pressure, caused by another cylinder, after the inlet valve or inlet port has closed and while the exhaust valve is still open, is used for post-charging the cylinder with air previously stored in the exhaust pipe and that the size of the turbine is selected so that there is virtually no post-charging of the cylinder with exhaust gases at engine speeds above said given engine speed range.

The self-supercharging thus achieved by post-charging and judicious exploitation of the phases of high and low instantaneous pressure in the exhaust pipe substantially improve the efficiency and the operation of the engine.

The invention also concerns a supercharged internal combustion engine arranged for carrying out the process described above, this internal combustion engine being characterised in that it comprises a number of cylinders connected to a same exhaust gas manifold such that the pressure in the exhaust pipe undergoes time-dependent fluctuations of substantial amplitudes and that it comprises opening means for the exhaust valve of a cylinder during induction or filling thereof so that, in a given engine speed range, a phase of low instantaneous exhaust pressure prevailing in the exhaust pipe enables the inlet pipe/cylinder/exhaust pipe to be scavenged while the inlet valve or inlet port and the exhaust valve are simultaneously open and that the phase of high instantaneous exhaust pressure, caused by another cylinder, after the inlet valve or inlet port has closed and while the exhaust valve is still open, is used for post-charging the cylinder with air previously stored in the exhaust pipe and that the size of the turbine is selected so that there is virtually no post-charging of the cylinder with exhaust gases at engine speeds above said given engine speed range.

The closing of the exhaust valve (end of its opening lift) occurs no sooner than the moment at which the pressure peak is reached in the exhaust pipe and no later than 30° crank angle after the said pressure peak is reached.

The closing of the inlet valve or inlet port (end of its opening lift) occurs between 30° and 10° crank angle before the end of the opening lift of the exhaust valve.

The cylinders connected to a same manifold have such firing intervals that, when the first cylinder is at the end of the intake stroke (end of the intake stroke for a "four-stroke"; end of the scavenging phase for a "two-stroke"), another cylinder is at the beginning of the exhaust stroke. The "pulse" generated by this other cylinder in the exhaust manifold ensures the post-charging of the first cylinder.

The invention may also apply to a two-stroke engine with exhaust valves and inlet valves or inlet ports. Consequently, the term "inlet, or intake, valve" will refer to both the inlet valve and the inlet port for two-stroke engines. In this case the exhaust valve is kept open after the inlet valve has closed in order to allow the utilisation of the "pulse" from another cylinder that is connected to the same exhaust manifold, after the scavenging phase.

In practice, the possible cylinder arrangement on a same exhaust manifold for a two-stroke engine and for cylinders which have a firing interval—or angular phase difference in their respective cycles expressed in crank angle degrees—which is equal or as constant as possible are as follows:

two cylinders with a firing interval of 180°;
three cylinders with a firing interval of 120°;
four cylinders with a firing interval of 90°.

Obviously, the invention also applies to four-stroke engines. In this case, the exhaust valve is normally closed after the beginning of the intake stroke and, according to the invention, is re-opened at the end of the intake stroke, and beyond the bottom dead centre.

In the case of a four-stroke engine, in which the exhaust valve is closed after the beginning of the intake stroke, advantageously, the exhaust valve is re-opened towards the end of the intake stroke.

Consequently, for a four-stroke engine, the preferred cylinder arrangements on a same exhaust manifold leading to a single turbine inlet, these cylinders having a firing interval—or an angular phase difference in their respective cycles expressed in crank angle degrees—which is equal or as identical as possible are as follows:

two cylinders with a firing interval of 360°;
four cylinders with a firing interval of 180°;
five cylinders with a firing interval of 144°;
six cylinders with a firing interval of 120°;
seven cylinders with a firing interval of approximately 103°.

In practice, it is possible to arrange eight, nine or ten cylinders on a same manifold leading to a single turbine inlet, although the higher the number of cylinders on a same manifold is, the weaker the post-charging effect.

The greater the amplitude of the pulse is, the more efficient the post-charging effect. The smaller the cross-sectional area of the turbine through which the pulse flows and the more reduced the volume of the manifold is, the greater the amplitude of the pulse. These two conditions are all the more easily met when there are fewer cylinders connected to a same turbine inlet.

BRIEF DESCRIPTION OF THE DRAWINGS

As well as the conditions outlined above, the invention consists of a number of other features which will be dealt with in more detail hereafter, using examples of the embodiment described with reference to the accompanying drawings, but which in no way limit its scope.

FIG. 3, which is a graph for a four-stroke turbocharged diesel engine with a four-cylinder arrangement on a same exhaust manifold and with a single turbine inlet, shows:

the variations in the average exhaust gas pressure feeding the turbine, represented by a solid line with the two outer dash-dotted curves representing the upper and lower limits of the fluctuations in the pressure feeding the turbine;

the variations in the average supercharging air pressure prevailing at the inlet to each of the cylinders represented by a dashed line;

the pressure, expressed in bars, is shown in the ordinate and the rotational speed, expressed in rpm, is shown in the abscissa.

FIG. 4 is a graph similar to that in FIG. 3, but for a supercharged four-stroke engine such as a truck engine or the like, with a six-cylinder arrangement on a same exhaust manifold and with a single turbine inlet.

Figure 5:
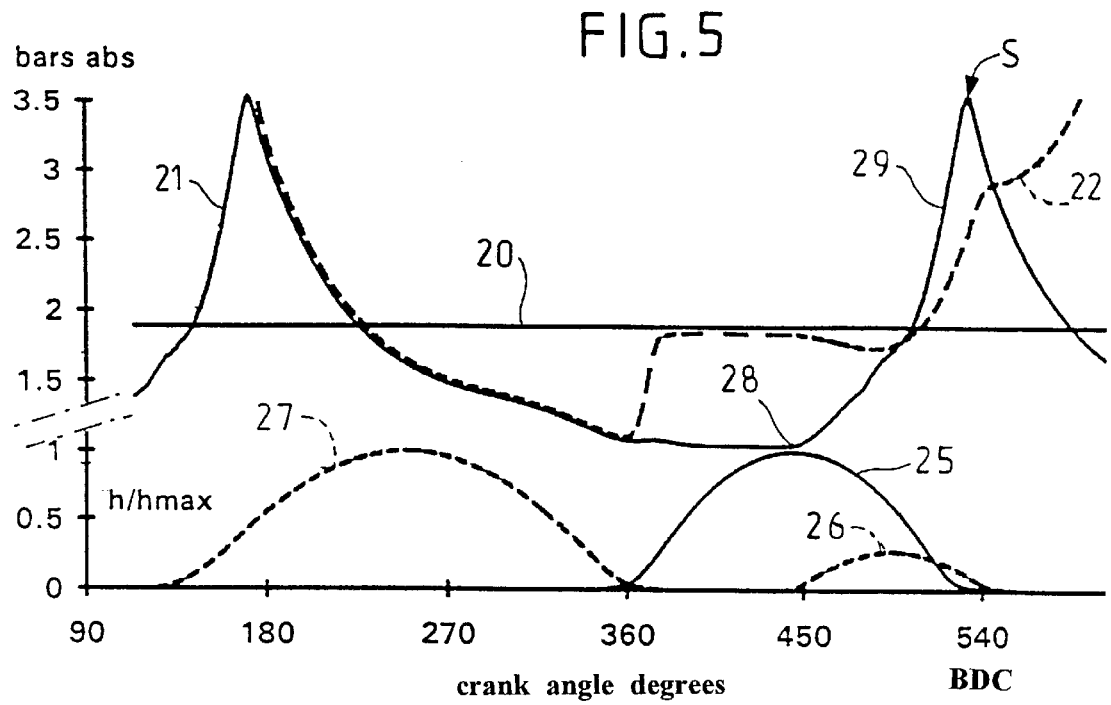

FIG. 5 is a graph representing, for a four-stroke engine according to the invention, such as a car engine, with a two-cylinder arrangement on a same exhaust manifold, the following:

in the lower part: on a solid line, the lift of the intake valve(s), and on a dashed line, the lift of the exhaust valve(s), represented as values in terms of the maximum lift value of the valve with the highest lift, are shown in the ordinate;

in the upper part: the variations in instantaneous pressure in the exhaust manifold represented by a solid line; the instantaneous boost pressure at the inlet to each of the cylinders, which for the purposes of simplification is taken to be constant over time (taking into account its slight degree of fluctuation) and represented by a straight line parallel to the abscissa; and the instantaneous pressure prevailing in the cylinder while the valves are open, represented by a dashed line;

the pressures, expressed in bars, are shown in the ordinate, the abscissa is the above-mentioned and is shown in the lower part for an engine operating at full load and at a low engine speed of 1500 rpm.

Figure 6:
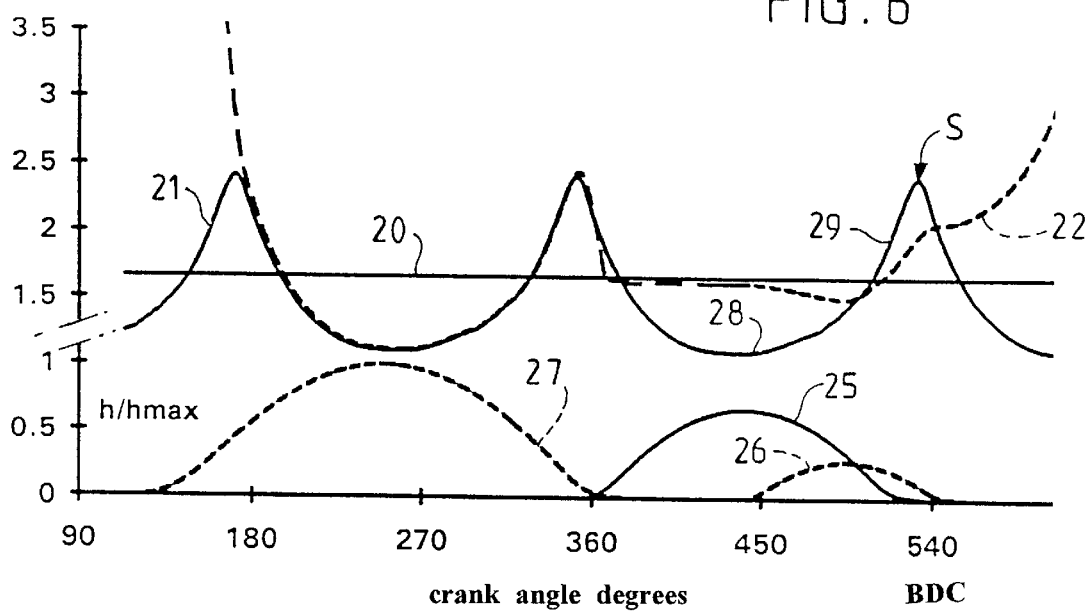

FIG. 6 is a graph similar to that in FIG. 5, but for a four-stroke engine according to the invention, such as a car engine, with a four-cylinder arrangement on a same exhaust manifold, at full load, at 1500 rpm.

Figure 7:
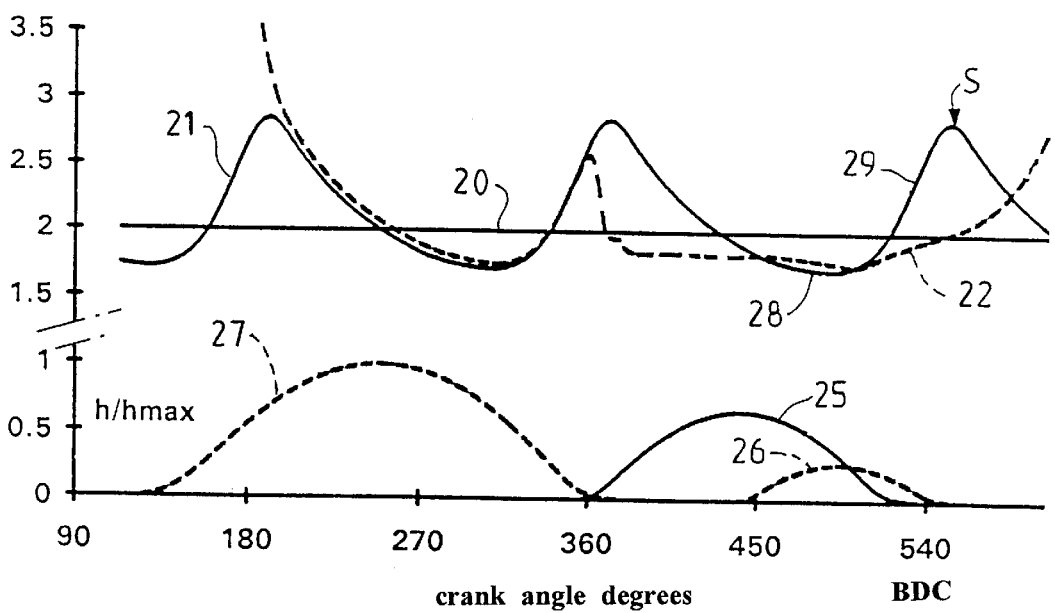

FIG. 7 is a graph similar to that in FIG. 6 for the same internal combustion engine operating at full load, at 4000 rpm.

FIG. 8 is a graph similar to that in FIG. 5 for a four-stroke supercharged engine, such as a truck engine or the like, according to the invention, with a six-cylinder arrangement on a same exhaust manifold, at full load, at 800 rpm.

FIG. 9 is a graph similar to that in FIG. 8 for the same internal combustion engine operating at full load, at 2200 rpm.

Figure 10:
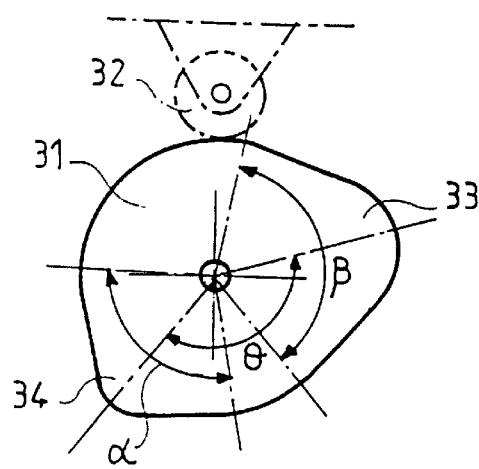

FIG. 10 shows schematically a cam for actuating the exhaust valve according to the invention, in accordance with the graphs in FIGS. 8 and 9.

Figure 11:
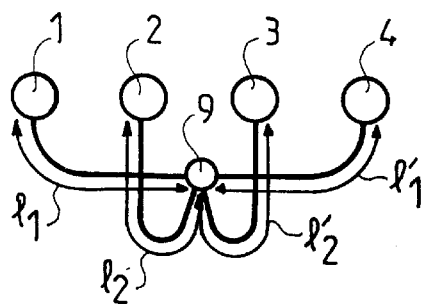
Figure 12:
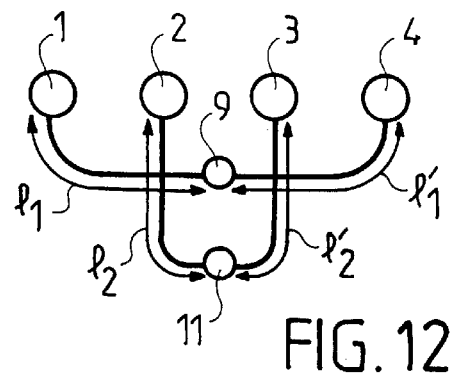

FIGS. 11 and 12 show schematically possible cylinder arrangements in a four-cylinder engine with one or two exhaust manifolds, with one or two turbine inlets.

Figure 13:
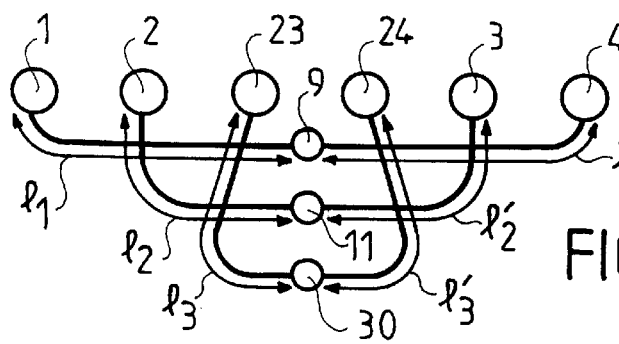
Figure 14:
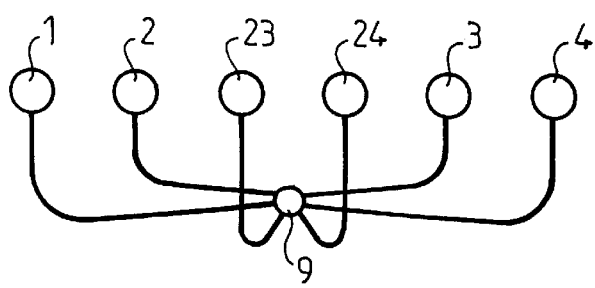

FIGS. 13 and 14 are schematic drawings similar to those in FIGS. 11 and 12, showing possible exhaust manifold arrangements in a six-cylinder engine, with three or one turbine inlets.

Figure 15A:
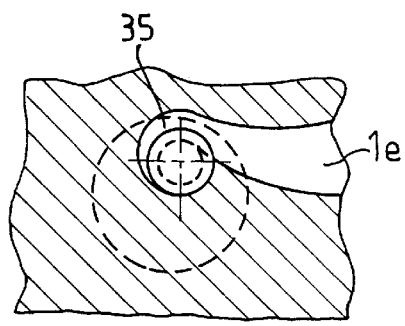
Figure 15B:
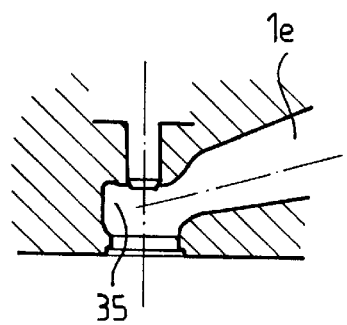

FIGS. 15A and 15B are schematic drawings in plan view and in vertical axial section of the exhaust pipe, in the port area.

Figure 16:
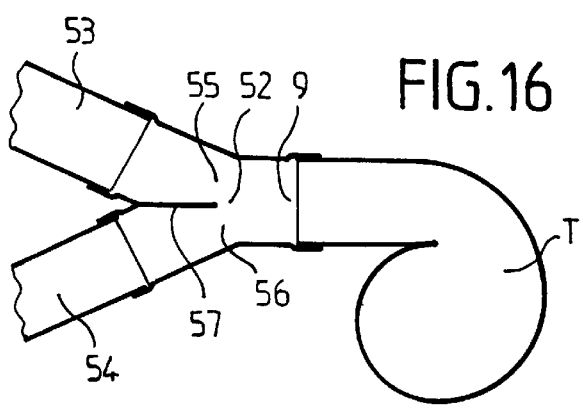

FIG. 16 shows schematically a throat on a manifold.

Figure 17:
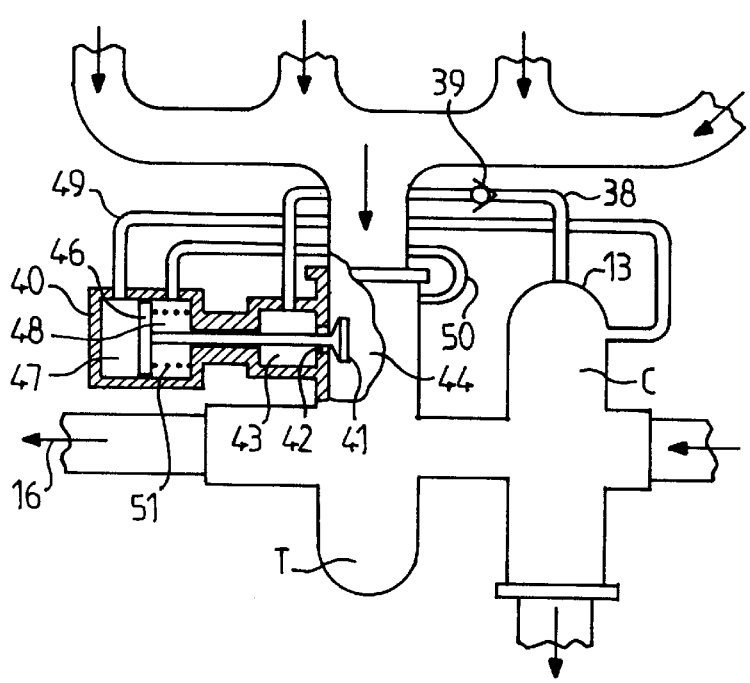

FIG. 17 shows a valve, which is built into the turbine casing, for bypassing the supercharging air from the compressor outlet to the turbine inlet and its control means.

Figure 18:
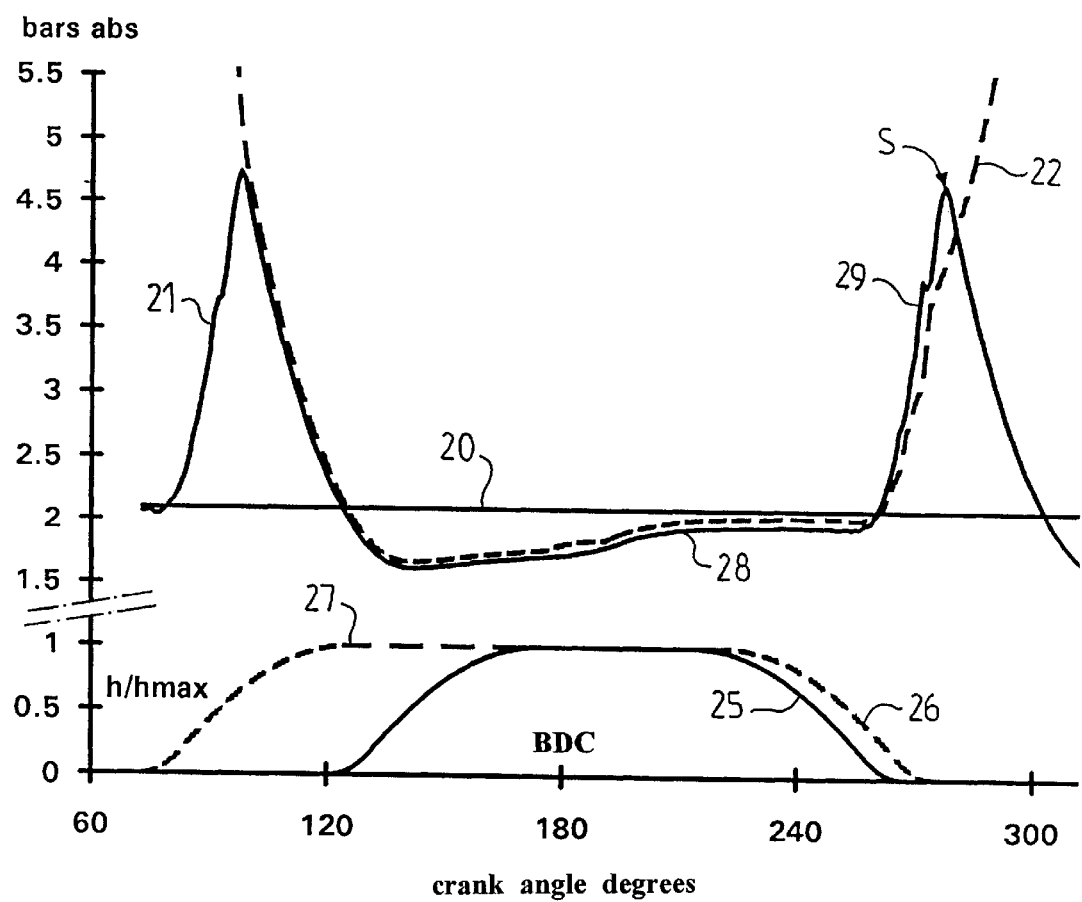

FIG. 18 is a graph similar to that in FIG. 5 for the same type of engine but two-stroke, with a two-cylinder arrangement on a same exhaust manifold and on a same turbine inlet, at full load, at 1500 rpm.

Figure 1:
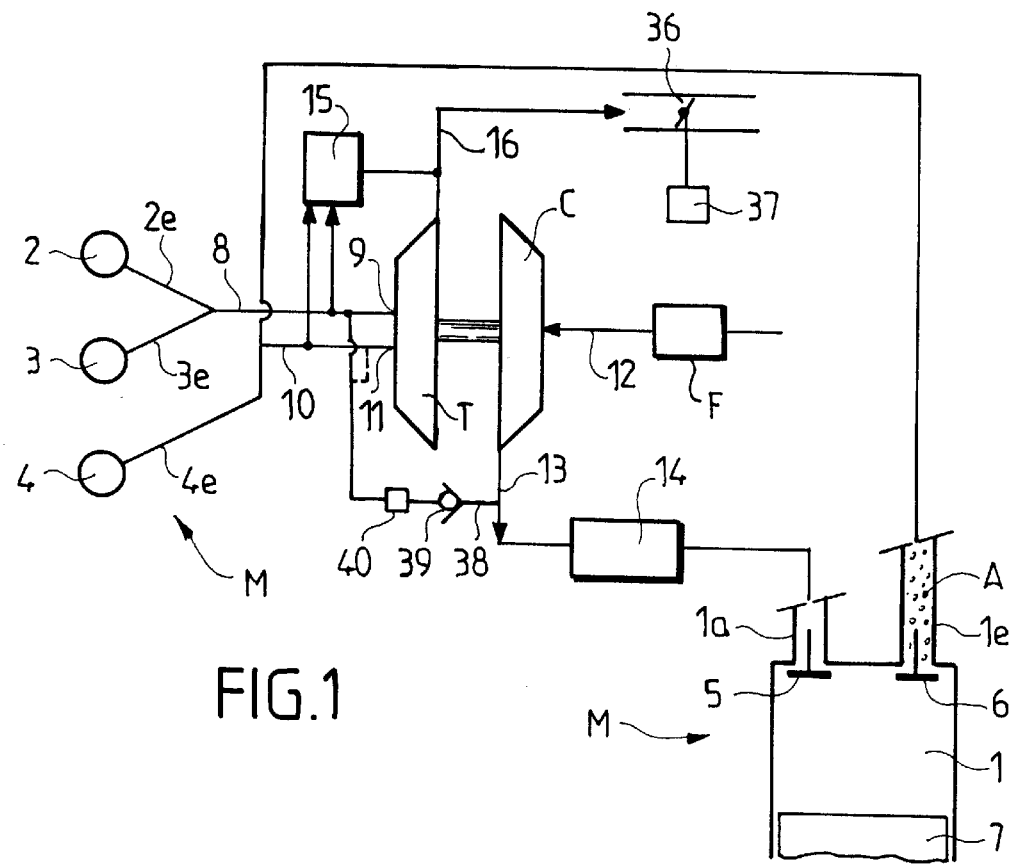
FIG. 1 of these drawings shows schematically an internal combustion engine operating in accordance with the invention.
Figure 19:
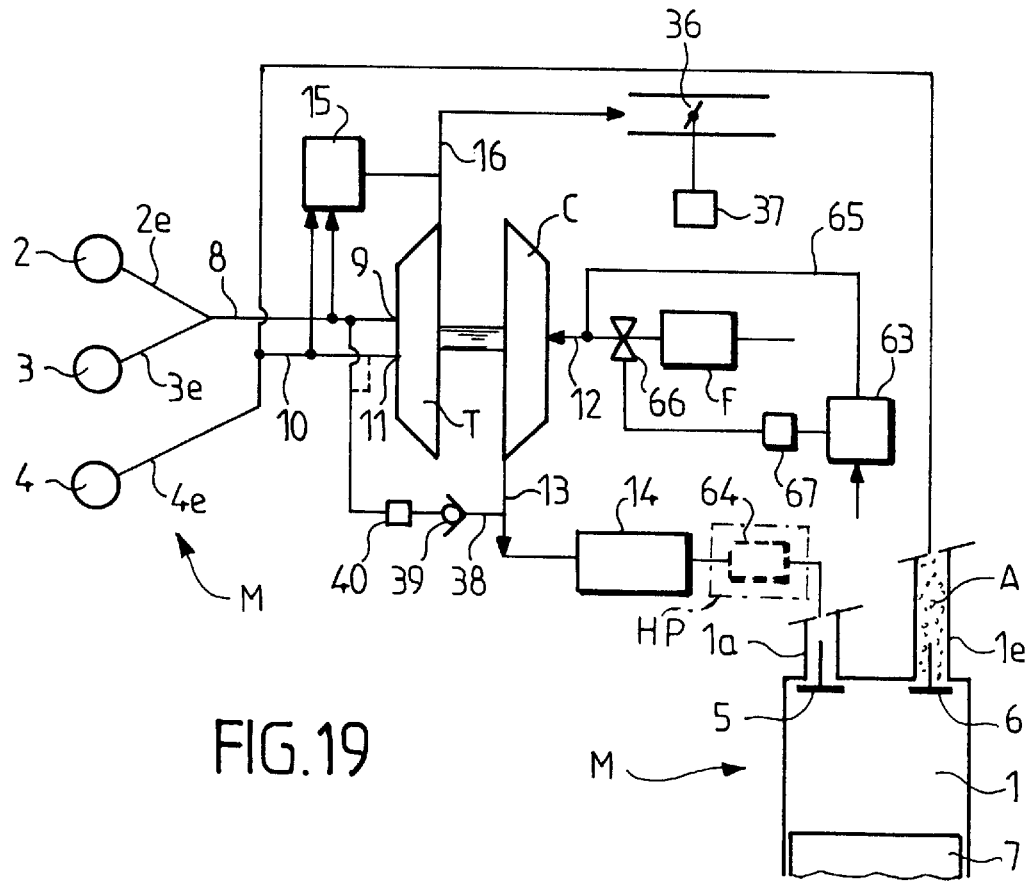

FIG. 19 shows schematically a variant of the embodiment of the engine in FIG. 1 but equipped with a mechanical compressor and a blower.

Figure 20:
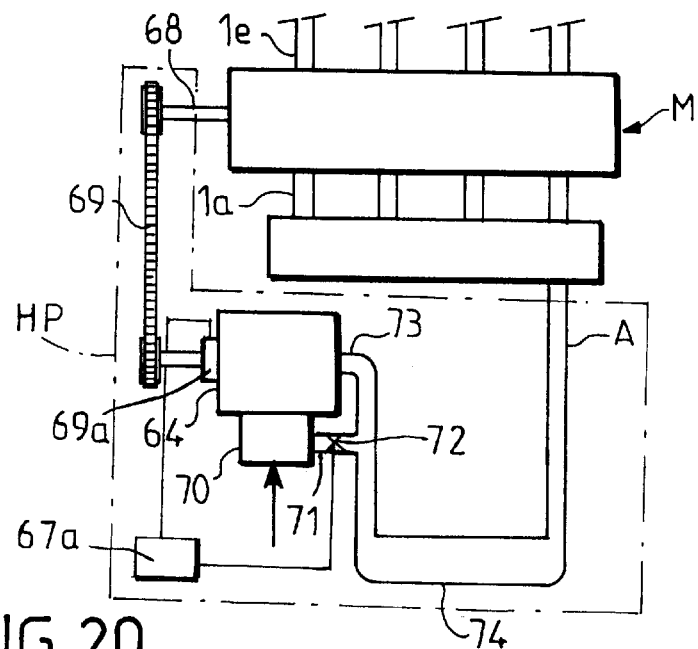

FIG. 20 is a more detailed representation of the layout of the mechanical compressor in FIG. 19.

Figure 21:
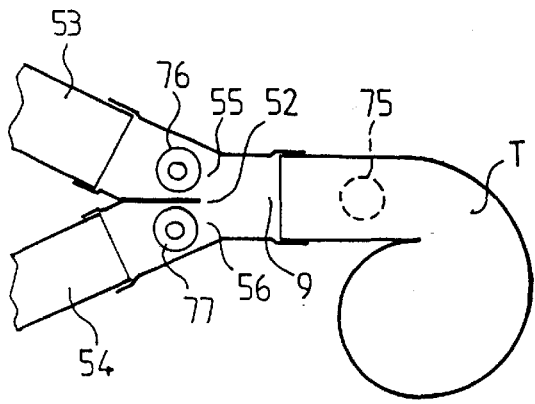

FIG. 21 shows a variant of the embodiment of the throat on the manifold as shown in FIG. 16, with two "wastegate" valves.

Figure 22:
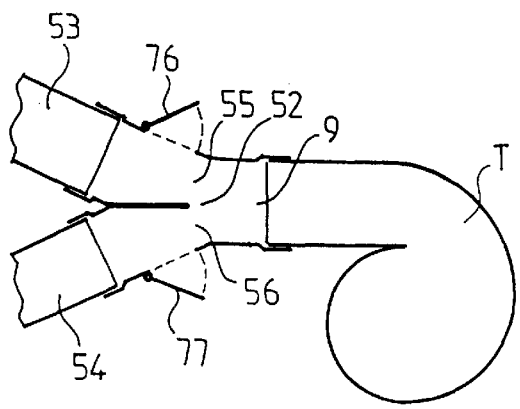

FIG. 22 shows schematically a variant of the embodiment of the valves in FIG. 21.

Figure 23:
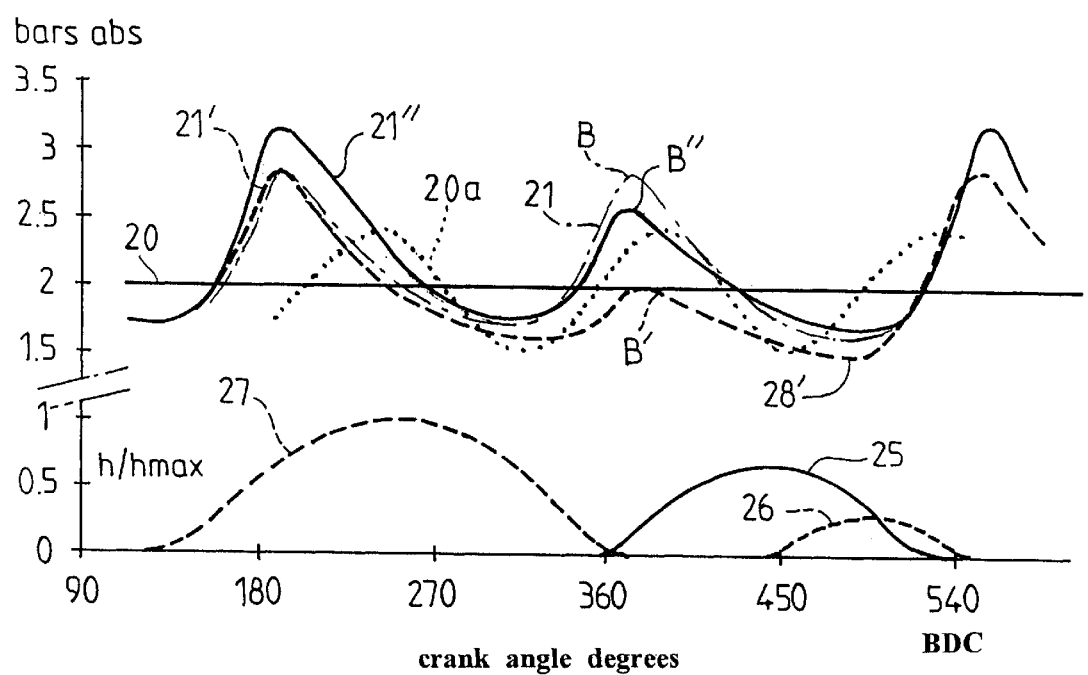

Finally, FIG. 23 is a graph similar to that in FIG. 7 for an internal combustion engine operating at a high engine speed and equipped with a throat on a manifold as shown in FIG. 21 or FIG. 22, both "wastegate" valves being open.

DETAILED DESCRIPTION OF THE INVENTION

With reference to FIG. 1 of the drawings, a four-stroke internal combustion diesel engine M is schematically represented. It is supercharged by a turbocharger assembly comprising a turbine T and a compressor C driven mechanically by the output shaft of the turbine T. The engine M is scavenged with air.

In the example in FIG. 1, the engine M comprises four cylinders 1, 2, 3, 4 which are represented in summary form. The cylinder 1 is represented in slightly more detail with a schematic representation of an inlet valve 5 and an exhaust valve 6. The piston 7 is partially represented. The cylinders 2, 3 and 4, which are similar to cylinder 1, are symbolically represented by circles. Only their exhaust pipes 2e, 3e, 4e are symbolically represented by lines. For cylinder 1, the intake pipe 1a and of the exhaust pipe 1e are shown in the port areas, with their symbolic line extensions.

The pipes 2e, 3e are arranged on a same exhaust manifold 8 that is connected to a first inlet 9 to the turbine. The pipes 1e, 4e are arranged on another exhaust manifold 10 that is connected to another inlet 11 to the turbine T.

The inlet 12 to the compressor passes atmospheric air through a filter F. The outlet pipe from the compressor delivers the compressed air which passes through a cooler 14 before it is distributed into the intake pipes, such as 1a, of the cylinders. In the case where the engine M is a two-stroke engine with valves, the drawing in FIG. 1 may be modified by the addition of an auxiliary blower, not shown in FIG. 1, designed to ensure scavenging at starting and at very low loads. This auxiliary blower may be located upstream of the compressor C or downstream of the cooler 14.

In the case where the engine shown in FIG. 1 is a car engine, a bypass valve 15 is generally provided as it is conventional for turbocharging this type of engine. It is called a "wastegate" and is controlled by the boost pressure, delivered by the compressor C so that some of the exhaust gases short-circuits the turbine T in order to prevent the boost pressure from exceeding a predetermined threshold. The valve 15 is located between the turbine inlets 9, 11 and the outlet 16. The "wastegate" is generally found more frequently on a cylinder arrangement comprising a single exhaust manifold with a single turbine inlet, as shown in FIG. 11 or in FIG. 14, because it is difficult to synchronise the simultaneous opening of two valves and because this valve is usually built into the turbine casing.

Such a valve 15 is normally necessary because, in order to ensure that the turbocharger operates in a relatively efficient manner at low engine speeds, in today's turbocharged engines, the turbocharger must be small in size. In such conditions, at a high speed, the boost pressures and consequently the maximum cylinder pressures would become too high. The opening of the valve 15 allows to avoid such too high pressures; however, this results in a loss in the engine efficiency, which can be explained by the fact that the pressure prevailing in the exhaust manifold greatly exceeds the boost pressure because bypass ratios, in terms of the overall gas flow rate, in the order of 40% and more, are common in today's very closed turbines.

FIG. 3 shows the operation of the engine according to the invention at full torque, or full load, as a function of the speed and expressed in rpm. This engine is a diesel car engine, with a prechamber in which the maximum admissible pressure is 135 bars, in the case of a four-cylinder arrangement on a same exhaust manifold, which supplies the inlet 9 to the turbine T as schematically shown in FIG. 11. A single bypass valve is built into the turbine casing and limits the boost pressure to 2 bars. The size of the turbine is selected so that the bypass ratio is limited to approximately 20% at the maximum engine speed, which in this case is 4000 rpm.

In FIG. 3, the solid line G represents the variations in the average instantaneous pressure of the gases prevailing in the exhaust manifold and feeding the turbine T. However, it must be understood that the value of this pressure fluctuates for any speed, around a point on the curve G. As an indication, in FIG. 3, the curves 18 and 19 have been drawn in dash-dotted lines and these represent, to a certain extent, the outer curves of the maximum and minimum values of the instantaneous pressure prevailing in the exhaust manifold.

Curve K, represented by a dashed line, shows the variations in the average instantaneous pressure prevailing at the inlet to each of the cylinders, which is sufficiently constant for only its mean value to be considered.

The pressures, shown in the ordinate, are expressed in bars ($10^5$ Pascals).

It will be noted that the instantaneous pressure fluctuations—as a relative value—reach a maximum amplitude at low engine speeds. The aim of the invention is to exploit these fluctuations.

At any engine speed, the difference in pressure between a point on the curve K and a point on the curve 19 characterises, to a certain extent, the maximum scavenging potential between the intake and the exhaust of the engine, while the difference between a point on curve 18 and a point on curve K characterises, to a certain extent the maximum post-charging potential.

The influence of the opening of valve 15 finds expression in the bend 17 that can be seen on curve K and also on curve G.

FIG. 4 is a graph that is similar to that in FIG. 3, which illustrates the same curves for a diesel engine, such as a truck engine or the like, with direct fuel injection and a maximum admissible pressure of 160 bars, in which six cylinders are connected to a same exhaust manifold, and with a single turbine inlet. A single bypass valve 15 is built into the turbine casing and is provided for limiting the boost pressure to 3.1 bars, i.e. a significantly higher value than in the example shown in FIG. 3. The size of the turbine is selected so that the bypass ratio reaches 22% at the maximum engine speed, which is 2200 rpm. Since the turbine is larger, the efficiency of the turbine and of the compressor is superior to that in the example shown in FIG. 3, by 8 and 6 points respectively.

It will be noted that, despite the six-cylinder arrangement in question with a single exhaust manifold, the pressure fluctuations generated in the exhaust manifold are significant and that the maximum amplitude—as a relative value—is reached at low engine speeds.

It is important to note the influence of the improved turbocharger efficiency on the respective positions of the pressure curves at full torque, shown in FIG. 4; particularly that the scavenging potential is considerably enhanced, while the post-charging potential is reduced in comparison to the conditions shown in FIG. 3. This is due to the improved turbocharger efficiency. From these operating conditions at full torque, it will be understood that by lowering the engine load, particularly at low engine speeds, the conditions for post-charging are substantially improved.

The operation of the engine can be better understood after detailed examination of FIGS. 5 to 9, which are presented in a similar manner. These Figures represent versus time—expressed in crank angle degrees—the valve-lift curves specific to the invention, and the instantaneous pressures prevailing at the inlet to the cylinder, in the cylinder itself, and in the exhaust manifold, for different engines and for different engine operating conditions.

The detailed explanation of the curves is based on the example shown in FIG. 5, corresponding to a two-cylinder arrangement on a same manifold and with a single turbine inlet, for a four-stroke engine such as a car engine, at full torque and at a low speed of 1500 rpm; it remains similar for FIGS. 6, 7, 8 and 9. A single bypass valve is built into the turbine casing and is provided for limiting the boost pressure to 2, as in the case of the engine in FIG. 3. The size of the turbine is selected so that the bypass ratio reaches 40% at the maximum engine speed, which is identical to that in FIG. 3, i.e. 4000 rpm.

In the abscissa, in the lower part, are shown the crank angle degrees defining the position of the piston 7 in the cylinder 1. In the upper part the instantaneous pressure fluctuations in the exhaust manifold are illustrated by the solid line 21, and the variations in the instantaneous pressure in the cylinder are represented by the dashed line 22.

The horizontal line 20 shows the average value of the boost pressure prevailing at the inlet to each of the cylinders, which is relatively stable.

In the lower part, in the ordinate, the intake and exhaust valve lifts are shown by the h/hmax ratio of the lift h over the maximum lift hmax of the exhaust valve which has the highest lift in this case. The lift of the intake valve(s) is represented in FIG. 5 by the solid line 25, while the lift of the exhaust valve(s) is represented by the dashed line 26, 27. In the abscissa, the crank angle degrees are shown as previously indicated. The bottom dead center BDC for cylinder 1 is shown on the axis of the abscissa in FIG. 5.

In FIG. 5 on the curve 21, which represents the instantaneous pressure in the exhaust manifold, a phase of low instantaneous pressure can be noted in the intake stroke before BDC; the position of the minimum instantaneous pressure before the pressure rises again is marked by 28. Thereafter, the instantaneous pressure in the exhaust manifold rises again at first progressively and then more rapidly, the section 29 on the curve 21 thus showing the high pressure zone which corresponds to the pulse from cylinder 4 following the cycle of cylinder 1 at 360°, until it reaches a maximum or a pressure peak S at around BDC, before falling again.

Referring now to the illustration of FIG. 3 in which a four cylinder arrangement on a single exhaust manifold is illustrated, a similar one could have been presented for a two-cylinder arrangement on a single exhaust manifold. In this case the pressure minimum 28 shown in FIG. 5 would correspond to the point on the curve 19 at the engine speed under consideration.

The peak S would correspond to the point on the curve 18.

The graphs in FIGS. 6 and 7 refer to the same engine as that in FIG. 3.

The graphs in FIGS. 8 and 9 refer to the same engine shown in FIG. 4.

It will be noted that in the case shown in FIG. 5, both the scavenging potential and the post-charging potential are greater than in the case shown in FIG. 6 for the same engine type and at the same engine speed, but with a four-cylinder arrangement; thus the minimum instantaneous pressure 28 corresponds to the point on the curve 19 in FIG. 3, while the peak S corresponds to the point on the curve 18 in FIG. 3 at 1500 rpm.

A similar graph to those in FIGS. 3 and 4 has not been drawn for the case of the engine corresponding to FIG. 5 as this demonstrates sufficiently the importance of the possible post-charging effect in the case of a two-cylinder arrangement on a same exhaust manifold and with a single turbine inlet and also shows that the scavenging potential is very high at all engine speeds. In fact, the instantaneous pressure in the exhaust manifold falls until it reaches the pressure prevailing at the turbine outlet, because there is no pulse during the intake stroke of cylinder 1. The supercharging potential is extremely high because the pressure reached in cylinder 1 exceeds by approximately 50% the maximum filling that the engine can withstand.

It is thus very easy to adapt the invention to a two-cylinder arrangement and this permits embodiment versions having wider turbines, without the need for a "wastegate".

The aim of the invention is to connect a number of cylinders to a same exhaust pipe such as 8 or 10, in such a way as to ensure that the fluctuations shown in line 21, particularly at low engine speeds, present significant amplitudes. Preferably, the number of cylinders arranged on a manifold is in four-stroke engines fewer than or equal to seven, but the three-cylinder arrangement, and is in two-stroke engines two, three or four.

Advantageously, only two cylinders 2, 3 or 1, 4 with a firing interval of 360° crank angle are connected to a same exhaust manifold 8 or 10. The exhaust pipe arrangement illustrated in FIG. 1 is shown in summary form in FIG. 12. It will be noted that this pipe arrangement, as schematically shown in FIG. 12, is achieved using a pipe length l1, l'1 or l2, l'2 grouping the exhaust orifices of the two cylinders 1, 4 or 2, 3 that are connected to a same exhaust manifold. It is desirable that the said pipe lengths l1, l'1 and l2, l'2 should be as equal as possible and that these pipes should end up at the nearest of the inlet of the turbine casing before they join together. In fact, the volume of air that can be stored and used in the subsequent post-charging phase can, at its maximum, be equal to the volume of a pipe. The volume thus made usable, corresponding to the volume of a pipe, must be sufficient to allow the desired self-supercharging effect; however, the manifold volume should be as low as possible so that the amplitude of the pressure fluctuations generated in the exhaust manifold is as great as possible.

In practice, the pressure fluctuations are principally governed by the effective cross-sectional area of the turbine, i.e. the "size of the turbine", and by the opening velocity of the lift 27 of the exhaust valve 6.

FIG. 11 is a schematic drawing of another grouping configuration for the exhaust orifices of four cylinders on a single inlet 9 to a turbine T, which permits achievement of fluctuations of sufficient amplitude such as illustrated on the curve 21 in FIG. 6, between a pressure minimum 28 and a pressure maximum or pressure peak S of the instantaneous pressure prevailing in the exhaust manifold.

By comparing FIG. 6, corresponding to a four-cylinder arrangement on a same manifold, with FIG. 5, corresponding to a two-cylinder arrangement on a same manifold, it will be noted that the relative amplitude of the "pulses" compared with the pressure at the compressor outlet, decreases with increasing cylinder number.

The schematic drawing in FIG. 13 relates to an engine with six cylinders (1, 4), (2, 3) and (23, 24) in which the exhaust orifices are connected in pairs to three inlets 9, 11, 30 to the turbine T, by means of the pipes with the length (l1, l'1), (l2, l'2), (l3, l'3).

FIG. 14 is a schematic drawing of another grouping configuration for the exhaust orifices of six cylinders (1, 4), (2, 3), (23, 24) on a single inlet 9 to a turbine T, thus allowing to achieve fluctuations of sufficient amplitude such as illustrated on the curve 21 in FIG. 8, between a pressure minimum 28 and a pressure maximum or pressure peak S of the instantaneous pressure prevailing in the exhaust manifold.

As may be observed in FIG. 5 or in FIG. 6, the pressure peak S at the inlet 9 to the turbine T occurs at approximately the end of the intake stroke of a first cylinder 1, i.e. at the end of the lift or opening of the intake valve 5. The rise S in pressure in the exhaust pipe related to cylinder 1 is caused by the other cylinder 4, which is in the blowdown phase and connected to this pipe.

According to the process in the present invention, the exhaust valve 6 of cylinder 1 is opened during the intake stroke as illustrated on the dashed line 26 in FIG. 5. In the case of a four-stroke engine, as represented by these embodiment examples, the curve 26 corresponds to the re-opening of the exhaust valve 6 which, after its conventional opening phase shown by the dashed curve 27, has been re-closed at the beginning of the intake stroke.

As may be observed (in FIG. 5, but also in FIG. 6 or again FIG. 8), the exhaust valve 6 begins to re-open, while, in the exhaust pipe, the instantaneous pressure, which corresponds to the minimum 28 of the instantaneous pressure 21 prevailing in the exhaust manifold, is lower than the mean value 20 of the boost pressure prevailing at the inlet to cylinder 1. The air inducted by the valve 5 which is still open, can scavenge the cylinder and the exhaust pipe while the intake valve 5 and the exhaust valve 6 are simultaneously open. In FIG. 1, a volume of air A, represented by the bubbles, is stored in the exhaust pipe 1e in the vicinity of the exhaust valve 6, and at its maximum, this air will be able to occupy the volume of the pipe of lenth l1.

At low engine speeds, the phase 29 (FIG. 5) of high instantaneous exhaust pressure (which is greater than the average boost pressure) will occur after the intake valve 5 has closed and while the exhaust valve 6 is still open.

The air A, previously stored in the exhaust pipe 1e, is forced back into cylinder 1 by the pressure crest 29 (FIG. 5), thus ensuring post-charging thereof. As shown in FIGS. 5, 6, and 8, the post-charging effect is clearly noticeable on the instantaneous pressure 22 prevailing in the cylinder during the high instantaneous pressure phase 29 at the exhaust. It coincides with the phase in which the intake valve 5 closes, as shown in the lift 25 represented by the solid line, while the exhaust valve 6 is still open, as shown in the lift 26 represented by the dashed line, around BDC. It will be noted that the smaller the number of cylinders connected to a same turbine inlet, the greater the post-charging effect. The main reason for this lies in the effective cross-sectional area of the turbine, which constitutes the cross-sectional area of the exhaust manifold outlet for the exhaust gas flow. The cylinders of the engines shown as examples in FIGS. 5 and 6 are identical; however, in the case of a four-cylinder arrangement as in FIG. 6, the cross-sectional area of the turbine, through which the pulse flows, is twice that of a two-cylinder arrangement as in FIG. 5. If an identical cylinder had been chosen in the case of the six-cylinder arrangement as in FIG. 8, the cross-sectional area of the turbine would have been 1.5 times greater than that of the four-cylinder arrangement. This explains the differences in the amplitude of the pressure fluctuations.

The post-charging effect described above does not offer a complete explanation for the improved filling achieved at low engine speeds. In fact, the increase in the charging efficiency represented, in a first estimate, by the rise in the pressure 22 at the beginning of the compression stroke, as shown in FIGS. 5, 6 and 8, in comparison with a conventional supercharged engine, ranges from a value of about 50%, for a two-cylinder arrangement, to almost 30% for a six-cylinder arrangement. In fact, the increase of the air flow rate at low engine speeds, caused by the scavenging phase at the end of intake stroke, may be as high as 50% to 100% at a given pressure ratio in the compressor. This fact considerably reduces or totally eliminates the difficulty experienced in matching the "engine map" with the "compressor map", which is a major problem in the turbocharging of engines with a wide speed range, and allows to compress the air with a substantially improved efficiency.

Most importantly, the rise in charging efficiency at low engine speeds allows the fueling to be considerably increased, due to the improved air-fuel ratio, which results in a rise in the pressure generated by the turbocharger.

This advantage is decisive at low engine speeds; in the case of the two-cylinder arrangement the maximum achievable torque is no longer governed by the lack of air but by the maximum admissible cylinder pressure. For the four-cylinder arrangement, the limit in the air-fuel ratio and the limit in the maximum cylinder are reached almost simultaneously.

One other decisive advantage is that there is no lag in the response of self-supercharging using the post-charging described above. In fact, for any load lower than full load, at a low engine speed from which a sudden increase in load and an acceleration of the engine occur, there is always a sufficient air quantity in the exhaust pipe 1e available to be forced back by the pulse from cylinder 4.

In fact, whether it is a medium load, with a medium air fuel ratio, for which the energy balance of the turbocharging loop ensures satisfactory scavenging conditions, or whether it is a very low load without any possibility of scavenging, but with a very large air fuel ratio and thus exhaust gases consisting mainly of air, the volume of the exhaust pipe 1e is filled throughout the length 11, to a large extent by a gas reserve consisting of pure cold air, or of almost pure air, at a relatively low temperature, of the order of 100° C. to 150° C., which corresponds to the exhaust temperature for the operating point considered.

The sudden increase in fueling in cylinder 4 generates a pulse in the exhaust manifold within a time delay corresponding to the expansion stroke, i.e. within half a crank revolution or also 0.03 second at 1000 rpm. The high pressure 29 of this pulse occurs at about the same time as at full load.

This characteristic enables the well-known problem of turbocharged engines to be eliminated.

Thus, it will be understood that the fueling, during engine transients, may be controlled not only by the boost pressure, as in conventional supercharged engines, but also by the difference between the average instantaneous pressure K prevailing at the inlet to each of the cylinders, and the average instantaneous pressure G prevailing in the exhaust manifold. In fact, this control variable represents the instantaneous scavenging potential that ensures the air A to be stored and to be forced back into cylinder 1 by the pulse from cylinder 4.

The sudden increase in load capacity of an engine, according to the invention, is thus identical to that of a non-supercharged engine, known as a naturally aspirated engine, as soon as the scavenging conditions are satisfied during the increase in load.

In practice, this threshold depends on the efficiency of the turbocharger and on the number of cylinders connected to a same turbine inlet. With a two-cylinder arrangement, this threshold corresponds to virtually no load.

Thus self-supercharging effective using a post-charging effect, which completes to a certain extent the action of the turbocharger, that would be suitably dimensioned for high engine speeds, with or without a "wastegate" depending on the engine type and on the operating range, but that would not deliver a sufficient boost pressure at low engine speeds.

It is therefore clear that the invention allows to substantially improve the operation of a turbocharged engine.

A comparison of FIGS. 6 and 7 on one hand and FIGS. 8 and 9 on the other, in addition to the variations in the mean values on curves K and G shown in FIGS. 3 and 4, corresponding to the same engine respectively, shows quite clearly by the relative position of the instantaneous pressures 20, 21, and 22, the change in the scavenging and post-charging conditions during the lift 26 of the exhaust valve 6 between a low speed and maximum operating speed for each of the engines shown in the examples.

Naturally, at low engine speeds, as small a turbine size as possible is desirable in order to benefit not only from a boost pressure K, but also from an instantaneous pressure in the exhaust manifold (19, G, 18) which are then both as high as possible because the filling of the cylinder 1 depends on the maximum instantaneous pressure 18, provided that, a priori, sufficient scavenging has been assured.

At high engine speeds and at full load, however, there should be no significant backflow scavenging or post-charging with burned gases, during the opening phase 26 of the exhaust valve 6, in order to avoid unwanted deterioration in the efficiency and the thermal loading of the engine.

As can be seen in FIGS. 3, 4 and 7, 9, these conditions are naturally satisfied if the size of the turbine T is selected so that, at maximum engine speed, the relative position of curves K and (19, G, 18) or of the instantaneous pressure curves 20 and (28, 21, 29, S) conforms approximately to the examples given, i.e. so that the average pressure G in the exhaust manifold or at the turbine inlet exceeds the boost pressure K by no more than 5% to 10% at the maximum engine speed at full load.

In fact, it will be noted that for the two types of cylinder grouping, the four-cylinder arrangement in FIG. 7 and the six-cylinder arrangement in FIG. 9 respectively, the relative position of the instantaneous pressures on the one hand, and the reduction—as a relative value—of the fluctuations in pressure 21 on the other hand, in accordance with the chosen opening diagram 26 of the valve 6, result in no backflow scavenging and no post-charging with burned gases.

It will be noted that the peak S moves naturally towards higher crank angles with increasing engine speed, as can be clearly seen in FIGS. 6 and 7 or in FIGS. 8 and 9, which helps to prevent post-charging at high engine speeds. This phenomenon would be further strengthened by selecting longer pipes 11, l'1, taking account of the angular time-lag of the pulse resulting from the time taken for a wave to travel from cylinder 4 to cylinder 1.

In reality, the gas exchange in the period considered occurs as an overall process as if, at high engine speeds, there were no more opening 26 of the exhaust valve.

Thus, a natural "variable geometry" effect is achieved by the use of a "fixed geometry".

Clearly, if, on the contrary, the aim were to recycle the burned gases at high power, the adjustment of the size of the turbine T and of the diagram 26 would be realised differently, in order to promote recycling. The adjustment of the said parameters would be facilitated and, in particular, a more closed turbine could be selected, resulting in an even higher filling at low engine speeds.

In the case of a two-cylinder arrangement on a same manifold with one turbine inlet, the invention imposes no lower limit on the turbine size. The adaptation of the invention is considerably simplified in this case, since there is no pulse between those of cylinders 1 and 4. For this reason no graph has been included for the maximum speed of the engine in FIG. 5.

It will be noted that one of the difficulties specific to the cylinder arrangements in which a large number of cylinders (six or more) are connected to a same manifold, is a result of the shorter time available between two pulses for achieving scavenging during the opening phase 26. This results in a shorter angular duration of this phase and, therefore, in a smaller maximum possible lift during this opening phase. The intensity of possible scavenging and post-charging is thus reduced.

Therefore, the smaller the number of cylinders connected to the same manifold, the longer the duration 26 and the opening phase lift will be. For example, the lift 26 in FIG. 5 for the two-cylinder arrangement, rises to 28% of the main lift 27, but could have been much greater if the opening duration of the phase 26 had been prolonged. For the four-cylinder arrangement of the engine shown in FIGS. 6 and 7, the relative lift 26 represents also 28% of the main lift 27, this being approximately the maximum possible value. A six-cylinder arrangement, for a car engine with the same acceleration level of the valve lift profiles as for the engine in FIG. 5 or FIGS. 6 and 7, would have a maximum possible lift 26 of approximately 20% of the main lift 27 and an opening duration shortened by 12° crank angle.

The lift 26 of an engine with a six-cylinder arrangement, as shown in FIGS. 8 or 9, represents 31% of the main lift 27, due to the greater acceleration level of the valve lift profiles. These profiles can be achieved in engines with a lower maximum speed, particularly when the cam, as shown in FIG. 10, is used in combination with a cam follower 32 having a profile that is circular or not flat.

The lift actuating means of the exhaust valve 6 in accordance with the curve 26 in FIGS. 8 and 9 can be achieved for example, as shown schematically in FIG. 10, by a cam 31 acting on a cam follower 32, which can be circular, as in this case, but which may also be flat, transmitting the motion to the valve 6. This cam 31 comprises a main lobe 33 with a relatively wide angle β, corresponding to the conventional lift 27 in FIG. 8.

The cam 31 has another lobe 34, or boss, the top of which is remote by an angle θ from the top of the lobe 33. This lobe is destined to cause the opening 26 of the exhaust valve 6. In the example in question, the angle β is 147° on the camshaft, i.e. 294° on the crankshaft for a four-stroke engine; the angle θ is 130° on the camshaft, while the angle α is 77° on the camshaft.

The angular duration α is chosen, in practice, to be as great as possible, as a function of the instantaneous pressure profile 28 that is dependent on the number of cylinders connected to a same exhaust manifold, in order to keep on preventing backflow scavenging at full load and at maximum engine operating speed, as can be seen in FIGS. 7 and 9.

It will be noted that the exhaust port 1e can be shaped for taking advantage of the re-introduction of air or burned gases in order to generate a swirl in cylinder 1, thereby improving combustion, as applied in a similar manner on the intake ports of certain diesel engines.

FIGS. 15A and 15B are schematic drawings of a spiral shape 35 of an exhaust pipe 1e in the port area for generating such a swirl.

This swirl which is generated by the post-charging effect, is thus more marked at low engine speeds. This phenomenon is particularly advantageous in engines in which it is difficult or impossible to generate a swirl through the intake port, as in valve-ported two-stroke engines.

The description of FIGS. 3 and 4 on one hand and FIGS. 6 and 8 on the other, has allowed to note the consequences of the increase in the turbocharger efficiency on the scavenging and post-charging potential.

In fact, in the cases shown in FIGS. 4 and 8, the high level of boost pressure (K, 20) in relation to the pressure prevailing in the exhaust manifold (G,21) at low engine speeds, due to the high turbocharger efficiency, results in a needlessly high scavenging potential and in a position of the pressure peak S exceeding insufficiently the boost pressure 20 to create a significant post-charging effect.

This phenomenon is all the greater when the invention is applied to industrial-type engines, where the compressor and turbine of the turbocharger, because of their size, can have an efficiency that is approximately 10 points higher than the efficiency in the example of the truck engine shown in FIGS. 4 and 8.

This phenomenon can easily be remedied by increasing the pressure level of the pulses in the exhaust manifold.

In order to increase the pressure level of the pulses in the exhaust gas pipe 1e in relation to the boost pressure 20, a throttle valve 36 can be provided on the turbine outlet 16, as illustrated in FIG. 1. The closing or opening of said throttle valve is assured by the control means 37, for example as a function of the difference between the average pressures K and G, in order to increase the turbine back-pressure when the scavenging conditions are too favourable and thus improving the post-charging potential.

Under such operating conditions (namely too great a scavenging potential and too weak a post-charging potential), one solution that is even more efficient is to bypass a part of the air delivered by the compressor C (upstream of the cooler 14) by means of a connecting duct 38 (see FIG. 1) between the outlet pipe 13 and the inlet pipes 8, 10 to the turbine T.

To enhance that quantity of air bypassed in such a way that the pressure G is equal to or greater than the pressure K, a non-return valve 39 can be installed upstream of the connecting duct 38, allowing the air to pass towards the turbine inlet, thus preventing a backflow of the burned gases in the opposite direction.

Valve control means 40 are provided on the duct 38, between the valve 39 and the pipes 8, 10.

FIG. 17 illustrates in detail the possible embodiment for the valve control means 40. This means, advantageously built into the turbine casing, comprises the following: a valve 41, which, when open, frees a passage area 42 between a chamber 43, supplied by the duct 38, and the interior 44 of the turbine casing inlet; a pneumatic cylinder 45 to control the opening or closing of the valve 41. This cylinder 45 comprises a piston 46, separating two chambers 47 and 48; the chamber 47 being supplied by a pipe 49 connected to the outlet 13 of the compressor C, while the chamber 48 is supplied by a pipe 50 connected to the interior 44 of the turbine casing inlet. The piston 46 is thus subjected to the pressure difference ΔP between the boost pressure and the average pressure G in the exhaust manifold, prevailing in the chamber 48. A spring 51 is provided in the chamber 48 in order to maintain the valve 41 in the closed position when the pressure K is lower than the pressure G.

Any desired characteristic for the pressure difference ΔP can be achieved depending on the force of the spring 51 and if necessary, by providing a stepped piston 46. In practice, it will be tried to balance the scavenging potential and the post-charging potential and to dispense with the valve 39, by selecting a characteristic such that, when the valve 41 is open, the pressure G is close to but less than the pressure K.

One variant of this embodiment is to use the two chambers 47 and 48, both filled with air at boost pressure, as a damping device for the valve 41, and no longer as a cylinder. In this case a nozzle, which is not shown in FIG. 17, is provided for connecting the chambers 47 and 48 through the piston 46 or at the exterior; the pipe 50 is removed. In this case, the position of the valve 41 is a result of the action of the spring 51 and of the balance of the pressure forces exerted acting on the valve head, i.e. the boost pressure K in the chamber 43 and the average pressure G in the interior 44 of the turbine casing inlet. This variant permits to switch off the operation of the valve 41 by maintaining it in the closed position above a certain threshold, for example that of the boost pressure, and thus restoring its full scavenging potential to the engine. This threshold may also depends on the load (instantaneous position of the gas pedal) and/or on the engine speed.

It will be understood that these control means 40 can be used alone or associated with a bypass valve 15, or "wastegate", and/or with a variable geometry turbine.

Control means governed by the pressure difference $\Delta P$, of the type shown in FIG. 17, can also constitute, according to the invention in particular, an efficient regulation of the device governing the nozzle flow area of a variable geometry turbine.

FIG. 16 is a schematic drawing of the embodiment of a throat 52 on the exhaust manifold upstream of the turbine inlet 9, such as in FIG. 11, where more than two cylinders are connected to the same turbine inlet. In the example considered, the cylinders 1 and 4 are connected to the pipe 53, while the cylinders 2 and 3 are connected to the pipe 54. These pipes 53, 54 join together at the turbine inlet 9 through two throttling zones 55, 56. An intermediary partition 57 ensures a gradual reduction of the cross-sectional area in the region of the throat 52.

The presence of the throat 52 causes a rise in the peak S (FIGS. 5 to 9), without any significant change in the level of the minimum 28 of the low instantaneous pressure phases.

By creating conditions similar to those achieved with a two-cylinder arrangement on a same turbine inlet, as is the case in FIG. 5, it is possible to substantially improve the post-charging effect and the scavenging potential. This effect becomes significant as soon as the cross-sectional area of the throttling passage 55, 56 becomes smaller than the cross-sectional area of the turbine (cross-sectional area resulting from both the stator and the rotor). In this case, the high pressure phase 29 is no longer a function of the "size" of the turbine, but rather of the cross-sectional flow area of the throttling passage.

FIG. 18 is a graph similar to that in FIG. 5 and shows the operation of a two-stroke engine according to the invention, such as a car engine, with a two-cylinder arrangement on a same exhaust manifold, at full load, at 1500 rpm. The engine is similar to that in FIG. 5 (with the same unit displacement and identical maximum cycle pressure).

The engine is equipped with a variable geometry turbine, in which the cross-sectional area, and thus the pressure ratio of the turbine, is controlled in such a way as to ensure that, below a certain boost pressure threshold, e.g. of 2 bars for a maximum boost pressure threshold of 3 bars at maximum power, the average pressure G is always close to the boost pressure K. The engine may also be equipped with a fixed geometry turbine and with the valve control means 40.

The velocity of the cam profiles of the exhaust valve(s) and of the intake valve(s) are significantly higher than in the example in FIG. 5 and that in FIG. 8.

As previously noted, the valve-lift curves specific to a two-stroke cycle are different from those of a four-stroke cycle in that the dashed curve 27, 26 showing the lift of the exhaust valve 6 merges together in a single curve. As in the graphs for four-stoke engines shown in FIGS. 5 to 9, the phase at the end of opening 26, after the intake valve has closed (in accordance with the lift 25 on a solid line), corresponds to the post-charging phase of the curve 26, whereas the phase during which the exhaust valves and intake valves are simultaneously open corresponds to the beginning of the opening phase 26, i.e. to the scavenging phase, not only of the cylinder, but also, as in a four-stroke engine, of the exhaust pipe 1e.

The level of instantaneous pressure 21 of the peak S, reached in the exhaust manifold, is significantly higher than that reached in FIG. 5, for a comparable level of boost pressure 20. This can be mainly explained by the advanced opening of the exhaust valve and by its opening velocity.

The post-charging effect achieved is very significant, because during this phase, the filling increases by almost 50% in comparison to the figure reached at the closing of the intake valve.

At higher engine speeds, satisfactory conditions for scavenging the cylinder are maintained throughout the duration of the intake valve opening, through the appropriate selection of the turbine size. The post-charging effect, as for the four-stroke engine, decreases and then disappears as engine speed is increased; however, the maximum admissible boost pressure level can be much higher than in the example of the four-stroke engine (2 bars abs) because of the delayed closing of the exhaust valve.

In the case of a two-stroke engine according to the invention, in which three, respectively four, cylinders would be connected to a same turbine inlet, the angular opening durations of the exhaust valve lift 27, 26 and of the intake valve lift 25 would be shortened by approximately 60°, respectively 90°, in comparison to the example in FIG. 18, in order to take into account the various angular phase differences between the cylinders.

The valve-lift curves in FIG. 18 permits a two-stroke engine, according to the invention, to operate throughout its entire operation range, the turbocharger being the sole scavenging air source; an auxiliary blower is not necessary.

Taking account of the great diversity in the possible application of the invention, it will be understood that it is superfluous to define in great detail the different valve-lift curves corresponding to each particular case.

It is important to note that the post-charging effect depends on the angular position, during the intake stroke of the cylinder 1, of the high pressure phase 29 and of the peak S of the instantaneous pressure 21 in the exhaust manifold, as well as on the pressure level that is reached at the peak S.

The pressure level and the angular position of the peak S, as we have seen in the different examples given, depend on several factors. They depend, of course, on the angular phase difference, which varies with the types of cylinder arrangement on a same turbine inlet, between the cylinder 1 and the cylinder generating the high pressure zone 29. They depend too, to a large extent, on the exhaust valve opening velocity and on the cross-sectional area through the turbine; they also depend, to a lesser extent, on the volume of the exhaust manifold.

All the examples given aim to improve the filling of the cylinder in the low engine speed range, and in particular they aim to "adapt" the invention to around one third of the maximum engine speed, as shown in FIGS. 5, 6, 8 and 18, i.e. in the range in which turbocharged engines suffer from an insufficient boost pressure.

In all these examples, it will be observed that the angular position of the peak S, in accordance with the case in question, corresponds approximately to an angle situated between the angle of the intake valve closing, as shown in curve 25, and the angle of the exhaust valve lift closing, as shown in curve 26.

The angle at which the intake valve is closed will generally be between 10° and 30° crank angle before the end of opening lift 26.

The invention allows a high torque to be obtained at the engine speed at which post-charging occurs, in particular at low engine speeds in the examples described.

Figure 2:
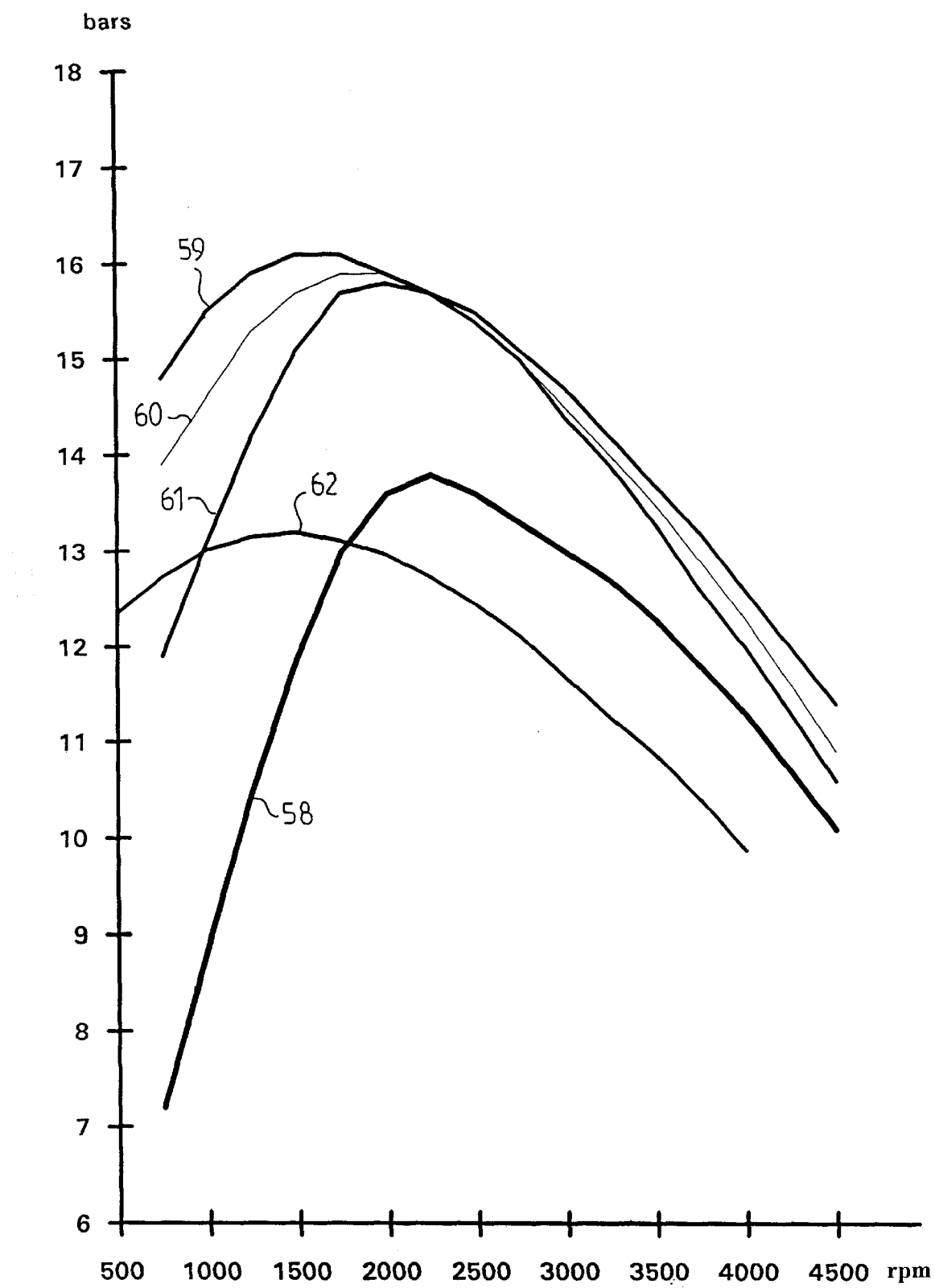
FIG. 2 is a graph representing the variations in the mean effective pressure, expressed in bars, as a function of the rotational speed in a four-stroke turbocharged diesel engine such as a conventional car engine, and for an engine according to the invention.

This important result is illustrated in FIG. 2, which represents the variations in the mean effective pressure in a cylinder of a conventional supercharged diesel engine and according to the invention in a car engine such as in FIGS. 5, 6, 7, and 18. It will be recalled that the mean effective pressure is equal to the work obtained per cycle divided by the cylinder volume displaced per cycle. In all the examples shown, each cylinder is equipped with two exhaust valves and two intake valves and with a prechamber combustion system.

The curve 58 represents a conventional supercharged engine; the curves 59, 60, 61 correspond to the case of a supercharged four-stroke engine, according to the invention with respectively two, four and six cylinders connected to a same exhaust manifold. The curve 62 is for the case of a supercharged two-stroke engine, according to the invention, with two cylinders connected to a same exhaust manifold.

At low engine speeds the mean effective pressure, according to the invention, is much higher than that of a conventional supercharged engine. The torque of the engine, which is proportional to the mean effective pressure, is thus considerably increased at low engine speeds.

It would also be possible to envisage a post-charging effect in the case of an engine without turbocharging, but having a potential for scavenging the exhaust pipe 1*e*, for example by means of "tuned" intake system as in the case of a racing car engine operating at very high speeds. Then a three-cylinder arrangement for a four-stroke engine could also be possible given that the valve-lift diagrams are very "open". Of course, the engine speed selected for adapting the invention would thus fall into the speed range corresponding to that speed for which the maximum torque is desired, in practice in the upper half of the said speed range.

Likewise, it will be understood that any variable control device for the opening of the exhaust valves 27, 26 and/or the intake valve 25 can, in certain cases, offer added flexibility to improve the adaptation of the invention.

With reference to FIG. 19, a variant of the embodiment of the engine in FIG. 1 can be seen. This variant includes all the elements described with reference to FIG. 1 and designated by the same numerical references, without describing them once more.

Furthermore, according to this variant, the engine is equipped with an additional blower 63, advantageously driven by a low-powered electric motor integrated, as well as an air filter, into the blower, or with a mechanical compressor 64, represented by a dashed line, and driven by the engine output shaft.

The blower 63, when it is operating, discharges air into a duct 65 connected to the inlet 12 to the compressor C of the turbocharger. A valve 66 is mounted onto the inlet pipe to the compressor C, upstream of the junction with the duct 65. The closing of the valve 66 is controlled while the blower 63 is operating in order to prevent a possible backflow of the air delivered by the blower from occurring on the side of the inlet pipe 12 opposite the compressor C. The blower 63 has a low maximum pressure ratio, namely in the order of 1.02/1.03 and is comprised, for example, of a two-staged or a three-staged centrifugal blower. Control means 67 are provided to start the blower 63 depending on the engine speed. Generally, the blower 63 is started at low speeds or at very low engine operating speeds.

Thus, the blower 63 permits post-charging without a turbocharger, or assists the operation of the turbocharger.

The blower 63 improves the post-charging at very low engine speeds where the scavenging potential is limited, non-existent or even negative, due to the fact that there is an insufficient pressure differential between the intake side and the exhaust side.

The utilisation of the blower 63 is particularly appropriate for a two-stroke engine, at idling speed.

For a transient operation, in particular during acceleration, as previously cited, the turbocharger lags somewhat; in fact the increase in the pressure at the exit of the blower C is slightly delayed in comparison to the pressure rise needed at the engine inlet. To improve the engine behaviour, particularly when accelerating from low engine speeds, a high-pressure stage HP is provided by means of a mechanical compressor 64 which supplies the inlet pipe to the engine, downstream of the cooler 14. In this case, the function previously realised by the blower 63 is then realised and amplified by the mechanical compressor 64, with the result that the blower 63 is made redundant.

The mechanical compressor 64 can also be utilised to improve the post-charging using a turbocharger, during transient conditions, particularly when accelerating, or when full torque is temporarily used, notably at low engine speeds and in the medium speed range.

In practice, the mechanical compressor will be engaged either during transient conditions from or above a certain acceleration threshold (above a given increase in load, for example from a given variation of the gas pedal position) or at constant speed in order to achieve a higher torque than that which is achieved using the turbocharger alone (overboost conditions). For any other operation, and particularly for steady-state conditions (constant engine speed) the mechanical compressor should preferably be disengaged so that maximum engine efficiency can be achieved.

As illustrated in FIG. 20, the mechanical compressor 64 is driven by the output shaft 68 of the engine M, for example by a toothed belt 69 and by means of an electro-mechanical clutch 69*a*. The air inlet 70 to the compressor 64 is connected upstream to the outlet of the air-cooler 14 and downstream to a bypass duct 71, controlled by a valve 72.

The outlet 73 for compressed air from the mechanical compressor 64 is connected to the air inlet A to the engine M by means of an air-cooler 74. The bypass duct 71 is connected to the air-cooler inlet 74.

The mechanical compressor 64 can generate a pressure ratio as high as 2, approximately.

The starting of the compressor 64 is achieved by engaging the clutch 69*a* and closing the valve 72, as a response to the action of the control means 67*a*. The air supplied to the inlet A is that air coming from the outlet 73 of the compressor 64. When the valve 72 is open, the compressor 64 is short-circuited.

It will be noted that the mechanical compressor 64 could be used alone, without the turbocharger, to supercharge the engine, according to the invention.

The mechanical compressor 64 is preferably arranged at the high-pressure stage, as this permits the two coolers 14 and 74 to be used in series for the compressed air delivered by the turbocharger, even if the compressor 64 is disengaged. However, the mechanical compressor could be used as a low-pressure stage.

With reference to the FIGS. 21 and 22, an improved embodiment of the "pulse converter" device with a throat as in FIG. 16, can be seen.

FIG. 21 is another schematic representation of the throat 52 on the exhaust manifold upstream of the turbine inlet 9. The same elements are designated by the same numerical references without describing them once more.

According to a conventional "wastegate" design, this would be located, as is shown schematically with a dashed-line circle 75, downstream of the throat 52, just at the turbine inlet.

According to the invention, it is advantageous to utilise a number of "wastegate" valves for a turbine inlet which is equal to the number of two-cylinder branches 53, 54 connected to a same inlet and to position these "wastegate" valves upstream of the throat 52.

In the example in question, where two two-cylinder branches 53, 54 are connected to the same turbine inlet, two "wastegate" valves 76, 77, namely one valve in each branch respectively 53, 54, are built into each throttling zone 55, 56, immediately upstream of the throat 52.

The valves 76 and 77 should preferably remain built into the casing of the turbine T, which means that the throat 52 is located in the interior of the entrance to the turbine casing, the entrance into which the partition 57 projects.

The valves 76 and 77 are simultaneously controlled by a single actuating means, namely a pneumatic cylinder.

In the schematic drawing in FIG. 21, the two valves 76, 77 are positioned side by side, which facilitates actuation by linkage.

It is possible to position the valves 76 and 77 as illustrated in FIG. 22, so that they are opposite each other. These valves consist of flaps, each articulated around its own axis which is perpendicular to the plan view in the FIG. 22, on the upper edge of each flap. This location facilitates the flow of the air towards the exhaust gas bypass passage that short-circuits the turbine, when the valves are in the open position.

At high engine speeds and high flow rates, the valves 76 and 77 are open, as for a conventional valve, because no backflow scavenging should occur in this engine operating range while the exhaust valve is being re-opened.

The presence of the two valves 76, 77 which are positioned upstream of the throat 52, results in a beneficial reduction in the throttling of the gas flow and thus in the instantaneous back-pressure in relation with the cylinder that is in the exhaust stroke. This is due to the wider flow passage available when the valves 76 and 77 are open and also due to the positioning of these valves upstream of the throat 52. Only the gas flow passing through the turbine T will be throttled, while the flow bypassed through the opened valves 76 and 77 is not throttled and is not slowed down.

One other advantage is the following: let us consider, for example, a cylinder whose exhaust in connected to the branch 53. During the intake stroke from top dead centre to bottom dead centre of the piston of this cylinder, the exhaust valve is either closed or re-opened during the overlap period with the intake valve. When a pulse is generated in the branch 54 (since the valves 76 and 77 upstream of the throat 52 are open), the pressure of the gases is lowered in the branch 53, in which there is no pulse. This is because the throttling zone 55, corresponding to the branch 53, is in communication, by means of the valve 76, with the pressure prevailing at the turbine outlet, and this pressure is much lower than that prevailing at the turbine inlet 9, downstream of the throttling zone 55. The above-mentioned cylinder, connected to the branch 53, is therefore protected from the pulse from the adjacent branch 54.

This result is represented in the FIG. 23 by the dashed line 21', which illustrates the pressure in the branch 53 prevailing at the exhaust of the said cylinder, for the variant of the embodiment with both valves 76, 77. The solid line 21" corresponds to the variant of the embodiment where only one "wastegate" valve would be located where the circle 75 is shown in FIG. 21. It is clear, from these curves, that the intermediary pulse B' generated by the adjacent branch 54 in the branch 53 is much weaker than the pulse B". By way of comparison, the dash-dotted curve 21 from FIG. 7 has been reproduced in FIG. 21, and this curve corresponds to the same operating conditions with the same turbine fitted with one "wastegate", but without a "pulse-converter". The intermediary pulse B is stronger and therefore causes a higher perturbation.

The variant of the embodiment with the two valves 76, 77, located upstream of the throat 52 permits the use of a turbine with a smaller size, without entailing the risk of backflow scavenging at high engine speeds, and thus ensures a greater torque at very low engine speeds.

It has been noted, with reference to FIG. 5, that the instantaneous boost pressure prevailing at the inlet to each of the cylinders was considered to be constant over time, for the purposes of simplification, and was represented as such (straight line 20). The lower the engine speed, the more likely this is to be true. At higher engine speeds, and particularly when inlet pipes are tuned for high engine speeds (i.e. inlet pipes such as 1a, with lengths so that intake pressure fluctuations occur at high engine speeds), it is possible to obtain intake pressure fluctuations such as those shown on the dotted curve 20a in FIG. 23. The straight line 20 represents the average of these fluctuations. In a conventional manner, these fluctuations are used to enhance the charging efficiency of the cylinder at high engine speeds. According to the invention, it is advisable to do the same, but also to take advantage of the positive instantaneous pressure differential between the inlet 20a and the outlet 21, 21', 21", while the exhaust valve is re-opened. This ensures that either a slight scavenging effect is maintained at high engine speeds, as shown in FIG. 23, or that the size of the turbine can be further reduced without the risk of any backflow scavenging.

I claim:

1. A method for improving the operation of an internal combustion engine of the type having a plurality of cylinders each having an inlet valve and an exhaust valve and an inlet and exhaust pipe, at least an exhaust manifold, at least some of said cylinders being connected to said exhaust manifold and conduits for supplying scavenging air from a turbocharger to said cylinders so that the exhaust gas pressure in said exhaust manifold will undergo time-dependent fluctuations of substantial amplitude, comprising the steps of causing, sequentially in said cylinders, the exhaust valve to open while the inlet valve of that cylinder is open to permit scavenging air from the inlet pipe to scavenge the exhaust pipe through that cylinder during a phase of low exhaust pressure while the inlet and exhaust valves are simultaneously open, causing the inlet valve to close while maintaining the exhaust valve open, post-charging the one cylinder with air from the exhaust pipe during a phase of high pressure from another of said cylinders while providing a sufficient turbine flow area in the turbocharger to avoid post-charging of said one cylinder with exhaust gases at engine speeds above a selected engine speed.

2. The method as claimed in claim 1 including the step of closing the exhaust valve of said one cylinder no sooner than the moment at which the pressure peak is reached in the exhaust pipe and before the crank angle reaches 30° after the pressure peak is reached.

3. The method as claimed in claim 1 including the step of closing the inlet valve at a crank angle between 30° and 10° before the end of opening of the exhaust valve.

4. The method as claimed in claim 1 including the steps of closing the exhaust valve for each cylinder after the beginning of the respective intake stroke and reopening the exhaust valve towards the end of the intake stroke of each cylinder.

5. An internal combustion engine of the type having a plurality of cylinders each having an inlet valve and an exhaust valve and an inlet and exhaust pipe, at least an exhaust manifold, at least some of said cylinders being connected to said exhaust manifold and conduits for supplying scavenging air from a turbocharger to said cylinders so that the exhaust gas pressure in said exhaust manifold will undergo time-dependent fluctuations of substantial amplitude, means for sequentially opening said exhaust valves of said cylinders while the inlet valve of the respective cylinder is open to permit scavenging air from the inlet pipe to scavenge the exhaust pipe of said cylinder during a phase of low exhaust pressure while the inlet and exhaust valves are simultaneously open and to maintain the exhaust valve open after the inlet valve has closed to allow post-charging of the one cylinder with air from the exhaust pipe during a phase of high exhaust pressure from another of said cylinders while providing a sufficient turbine flow area to avoid post-charging of said one cylinder with exhaust gases at engine speeds above a selected engine speed.

6. The engine as claimed in claim 5 wherein said engine is of the four-stroke type and wherein the exhaust valve is closed after the beginning of the intake stroke and reopened towards the end of the intake stroke.

7. The internal combustion engine as claimed in claim 6 wherein a cam is provided with a lobe having an angular duration selected to prevent back flow scavenging at full engine speed.

8. The internal combustion engine as claimed in claim 7 wherein the number of cylinders connected to said exhaust manifold does not exceed seven.

9. The internal combustion engine as claimed in claim 8 wherein said cylinders are all connected to a single turbine inlet.

10. Internal combustion engine as claimed in claim 7 wherein at least two of said plurality of cylinders are connected to the same exhaust manifold and lead to a single turbine inlet and are set at a 360° crank angle.

11. An internal combustion engine as claimed in claim 7 wherein said engine is a four-stroke engine including four cylinders connected to a said exhaust manifold and leading to a single turbine inlet and are set at a 180° crank angle.

12. The internal combustion engine as claimed in claim 7 wherein said internal combustion engine is a four-stroke engine and includes six cylinders connected to said exhaust manifold and lead to a single turbine inlet and are set at a 120° crank angle.

13. The internal combustion engine as claimed in claim 5 wherein said cylinders are connected to said exhaust manifold and are provided with firing intervals such that, where one of said cylinders is at the end of its intake stroke, another cylinder is at the beginning of its blow down phase with the pulse generated by said another cylinder in said exhaust manifold insuring the post charging of said first cylinder.

14. An internal combustion engine as claimed in claim 13 wherein said engine is a two stroke engine and includes means for maintaining the exhaust valve open after the inlet valve has closed in order to allow the utilization of the pulse from said another cylinder that is connected to said exhaust manifold after the scavenging phase.

15. An internal combustion engine as claimed in claim 14 including a two-stroke engine having two cylinders connected to said exhaust manifold and which are set at a 180° crank angle.

16. An internal combustion engine as claimed in claim 14 comprising a two-stroke engine having three cylinders connected to said exhaust manifold and which are set at a 120° crank angle.

17. Internal combustion engine as claimed in claim 5 wherein said turbo charger has a turbine outlet and a throttle valve is located in said outlet and is provided with control means for controlling the degree of opening of said throttle valve depending on the engine speed.

18. The internal combustion engine as claimed in claim 5 wherein said turbo charger includes a compressor and a connecting duct is provided between an outlet pipe of the compressor and the inlet pipe to the turbine, a non-return valve being installed in said duct and valve control means being provided for controlling flow through said duct.

19. The internal combustion engine as claimed in claim 18 wherein said valve control means are governed by boost pressure and by the average of the pressure in said exhaust manifold to ensure opening of said valve which controls the opening of said connecting duct and so that the boost pressure and average pressure remain approximately equal in a range located below a maximum boost pressure threshold.

20. An internal combustion engine as claimed in claim 19 wherein each of said branches is provided with one waste gate valve for each of said branches, a said waste gate valve being located upstream in the direction of flow of said throat.

21. An internal combustion engine as claimed in claim 20 wherein said exhaust pipe adjacent said exhaust valve is provided with a shape to generate a swirl in said respective cylinder during the post-charging phase.

22. An internal combustion engine as claimed in claim 21 including an additional blower.

23. An internal combustion engine as claimed in claim 21 including a mechanical compressor.

24. An internal combustion engine as claimed in claim 21 wherein said inlet pipes are tuned for high engine speeds.

25. The internal combustion engine as claimed in claim 5 wherein said engine is a 4-stroke engine having a subdivided exhaust manifold, of pulse converter type, comprising at least two branches each connecting two cylinders set at a 360° crank angle, each said branch being connected to the same turbine inlet through a throat provided to connect said two-cylinder branches to said turbine inlet.

26. An internal combustion engine as claimed in claim 23 having a pressure supercharging stage including a mechanical compressor and a cooler including means for connecting said cooler between an outlet of said compressor and the air inlet to the engine such that the intake air permanently flows through the cooler without regard to the operation of said mechanical compressor.

* * * * *

UNITED STATES PATENT AND TRADEMARK OFFICE
CERTIFICATE OF CORRECTION

PATENT NO. : 5,819,693
DATED : October 13, 1998
INVENTOR(S) : Curtil, Remi

It is certified that error appears in the above-identified patent and that said Letters Patent is hereby corrected as shown below:

Column 11, line 64, change "effective" to --is achieved--.

Claim 20, column 22, line 39, change "20" to --21--; and change "19" to --20--.

Claim 21, column 22, line 43, change "21" to --22--; and change "20" to --21--.

Claim 22, column 22, line 47, change "22" to --23--; and change "21" to --22--.

Claim 23, column 22, line 49, change "23" to --24--; and change "21" to --22--.

Claim 24, column 22, line 51, change "24" to --26--; and change "21" to --22--.

Claim 25, column 22, line 53, change "25" to --20--.

Claim 26, column 22, line 59, change "26" to --25--; and change "23" to --24--.

Signed and Sealed this

Fourteenth Day of November, 2000

Attest:

*Attesting Officer*

Q. TODD DICKINSON

*Director of Patents and Trademarks*